US012789351B2

(12) United States Patent
Fang et al.

(10) Patent No.: US 12,789,351 B2
(45) Date of Patent: Nov. 10, 2026

(54) HEIGHT-ADJUSTABLE BICYCLE REPAIR STAND

(71) Applicants: TALLGUY AND MARK PRECISION CO., LTD., Taichung City (TW); REVOTECH INTERNATIONAL CO., LTD., Yuanlin City (TW)

(72) Inventors: Shih-Yao Fang, Taichung City (TW); Jin-Kuei Wu, Yuanlin City (TW)

(73) Assignees: TALLGUY AND MARK PRECISION CO., LTD., Taichung City (TW); REVOTECH INTERNATIONAL CO., LTD., Yuanlin City (TW)

( * ) Notice: Subject to any disclaimer, the term of this patent is extended or adjusted under 35 U.S.C. 154(b) by 404 days.

(21) Appl. No.: 18/613,963

(22) Filed: Mar. 22, 2024

(65) Prior Publication Data

US 2024/0316748 A1 Sep. 26, 2024

(30) Foreign Application Priority Data

Mar. 22, 2023 (TW) ................................ 112110773

(51) Int. Cl.
*B25H 1/10* (2006.01)

(52) U.S. Cl.
CPC ..................................... *B25H 1/10* (2013.01)

(58) Field of Classification Search
CPC ...... F16H 19/04; F16H 55/26; Y10T 74/1967; B66F 3/02
USPC ....... 74/422, 89.17, 29, 89.11, 498, 30, 409, 74/109
See application file for complete search history.

(56) References Cited

U.S. PATENT DOCUMENTS 4,421,209 A * 12/1983 Vermette ............. B66F 9/07559 182/129
6,547,116 B2 * 4/2003 Anderson ................. B60R 9/10 224/536
2021/0276845 A1 * 9/2021 Gilbride ................. B25J 11/005

* cited by examiner

*Primary Examiner* — Katina N. Henson
*Assistant Examiner* — Ronak Thawani
(74) *Attorney, Agent, or Firm* — MUNCY, GEISSLER, OLDS & LOWE, P.C.

(57) ABSTRACT

A bicycle repair stand includes a supporting rod and a lifting device. The supporting rod has a sleeve tube and a gear rack inserted into the sleeve tube. The lifting device includes a gear engaged with the gear rack, a rotating disk connected with the gear, a fixed ring surrounding the rotating disk, a driving base, and two rolling elements disposed between the driving base, the fixed ring, and the rotating disk. When rotated, the driving base pushes one rolling element towards the other rolling element, so that the rotating disk and the gear are rotated relative to the fixed ring, thereby driving the gear rack to move upwards or downwards. When the gear rack is pressed down, the rotating disk is unable to rotate relative to the fixed ring through the rolling elements, so that the gear rack is unable to move downwards to avoid rapid fall.

8 Claims, 21 Drawing Sheets

HEIGHT-ADJUSTABLE BICYCLE REPAIR STAND

BACKGROUND OF THE INVENTION

1. Field of the Invention

The present invention relates to bicycle repair stands and more particularly, to a bicycle repair stand that is capable of adjusting its height.

2. Description of the Related Art

Currently, a common bicycle repair stand includes a supporting rod, an expandable and retractable tripod pivoted at the bottom of the supporting rod, and a clamp provided at the top of the supporting rod. The user can clamp the bicycle on the clamp for easy maintenance. In addition, the bicycle repair stand is also equipped with a lifting device to facilitate the user to adjust the height of the supporting rod. However, when a heavier bicycle (such as an electric-assisted bicycle) is clamped on the clamp, it is easy for the lifting device and the supporting rod to be unable to bear the weight of the bicycle, causing the risk of rapid falling. Therefore, there is still room for improvement in the structure of the existing bicycle repair rack.

SUMMARY OF THE INVENTION

It is one objective of the present invention to provide a bicycle repair stand, which can avoid the risk of rapid falling to increase the safety of use.

To attain the above objective, the bicycle repair stand of the present invention comprises a supporting rod and a lifting device. The supporting rod has a sleeve tube and a gear rack movably inserted into the sleeve tube and provided with a first teeth portion. The lifting device includes a shell, a gear, a rotating disk, a fixed ring, a driving base, two rolling elements, and a pushing member. The shell has a first chamber penetrated by the sleeve tube and the gear rack and a second chamber communicating with the first chamber. The gear is rotatably disposed in the second chamber of the shell and has a second teeth portion meshed with the first teeth portion of the gear rack. The rotating disk is coaxially connected with the gear and has an arc-shaped outer peripheral surface provided with a tangent plane. The fixed ring is mounted in the second chamber of the shell and surrounds the outer peripheral surface of the rotating disk and has an inner wall surface forming an annular space with the outer peripheral surface of the rotating disk. The driving base is rotatably installed in the shell and has a disk portion received in the second chamber and having two pushing protrusions inserted into the annular space and forming an insertion space with the inner wall surface of the fixed ring and the tangent plane of the rotating disk, and a shaft portion extending from the disk portion and exposed to the shell. The rolling elements are accommodated in the insertion space. The pushing member is disposed between the rolling elements and applies a push force to the rolling elements. When an external force is applied to rotate the shaft portion of the driving base, one of the rolling elements is pushed by one of the pushing protrusions to move towards the other of the rolling elements, so that the rotating disk and the gear are driven to rotate relative to the fixed ring, thereby driving the gear rack to move upwards or downwards relative to the sleeve tube. When a downward pressure is applied to the gear rack, the downward pressure is transmitted to the rotating disk through the first teeth portion and the second teeth portion. At this time, since the tangent plane of the rotating disk is abutted against the rolling elements, the rolling elements are abutted against the inner wall surface of the fixed ring, so that the rotating disk is unable to rotate relative to the fixed ring, thereby preventing the gear rack from moving downwards relative to the sleeve tube.

It can be seen from the above that the bicycle repair stand of the present invention uses the lifting device to drive the gear rack to move upwards or downwards relative to the sleeve tube, thereby adjusting the height of the supporting rod, and further, the lifting device provides a locking mechanism to prevent the gear rack from rapid falling, thus allowing users to be safer when using the bicycle repair stand of the present invention.

Preferably, each of the rolling elements is a roller. A first spacing is defined between the inner wall surface of the fixed ring and the tangent plane of the rotating disk, and a second spacing is defined between the inner wall surface of the fixed ring and the outer peripheral surface of the rotating disk. A diameter of each rolling element is approximately equal to the first spacing and larger than the second spacing.

Preferably, the rotating disk has a limiting hole, and the gear has a limiting shaft fitted into the limiting hole of the rotating disk, so that the rotating disk is coaxially connected to the gear.

Preferably, the disk portion of the driving base has a bearing plate and six said pushing protrusions extending from the bearing plate and arranged at equal intervals with respect to the shaft portion. The rotating disk has six said tangent planes arranged at equal intervals with respect to the limiting hole. When the pushing protrusions are inserted into the annular space, the bearing plate is abutted against the rotating disk, and one said insertion space is formed between one of the pushing protrusions, the inner wall surface of the fixed ring, and one of the tangent planes. The insertion spaces each contain two said rolling elements and one said pushing member.

Preferably, the lifting device further includes a blocking plate abutted against the fixed ring and the rotating disk and having a sleeve hole fitted to the limiting shaft of the gear. In this way, the blocking plate is used to cover the annular space and the insertion space.

Preferably, the shell has an annular groove provided with a convexity, and the fixed ring has an outer wall surface provided with a concavity engaged with the convexity of the shell, so that the fixed ring is firmly fixed in the annular groove.

Preferably, the pushing member is a spring having two ends thereof abutted against the rolling elements. When one of the rolling elements is moved towards the other of the rolling elements, the spring is compressed by the rolling elements.

Preferably, the pushing member is formed by two rollers arranged in a stacked manner. When one of the rolling elements is moved towards the other of the rolling elements, the rollers are abutted against the rolling elements.

Other advantages and features of the present invention will be fully understood by reference to the following specification in conjunction with the accompanying drawings, in which like reference signs denote like components of structure.

DETAILED DESCRIPTION OF THE INVENTION

Figure 1:
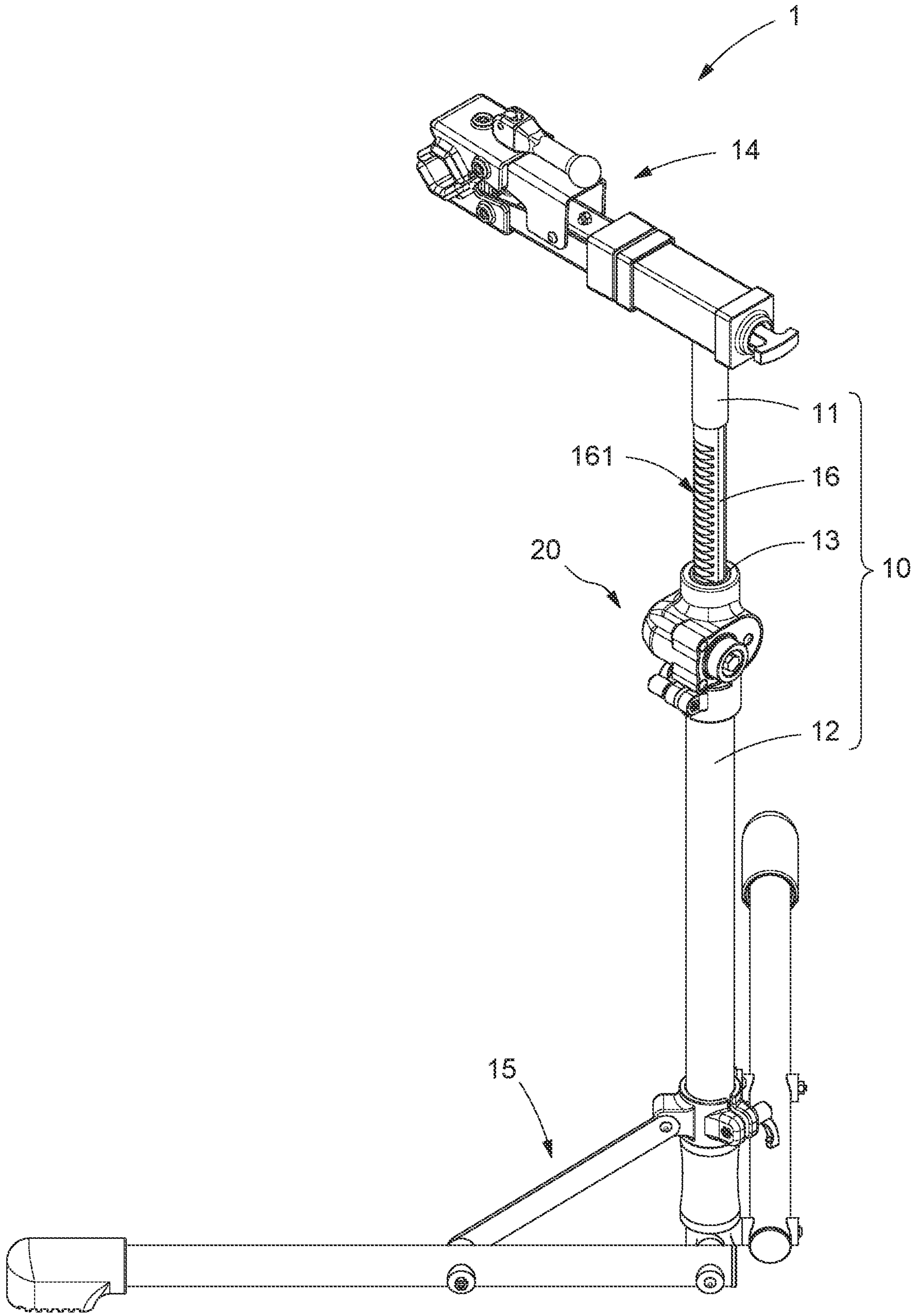
FIG. 1 is a perspective view of a bicycle repair stand of a first embodiment of the present invention.
Figure 2:
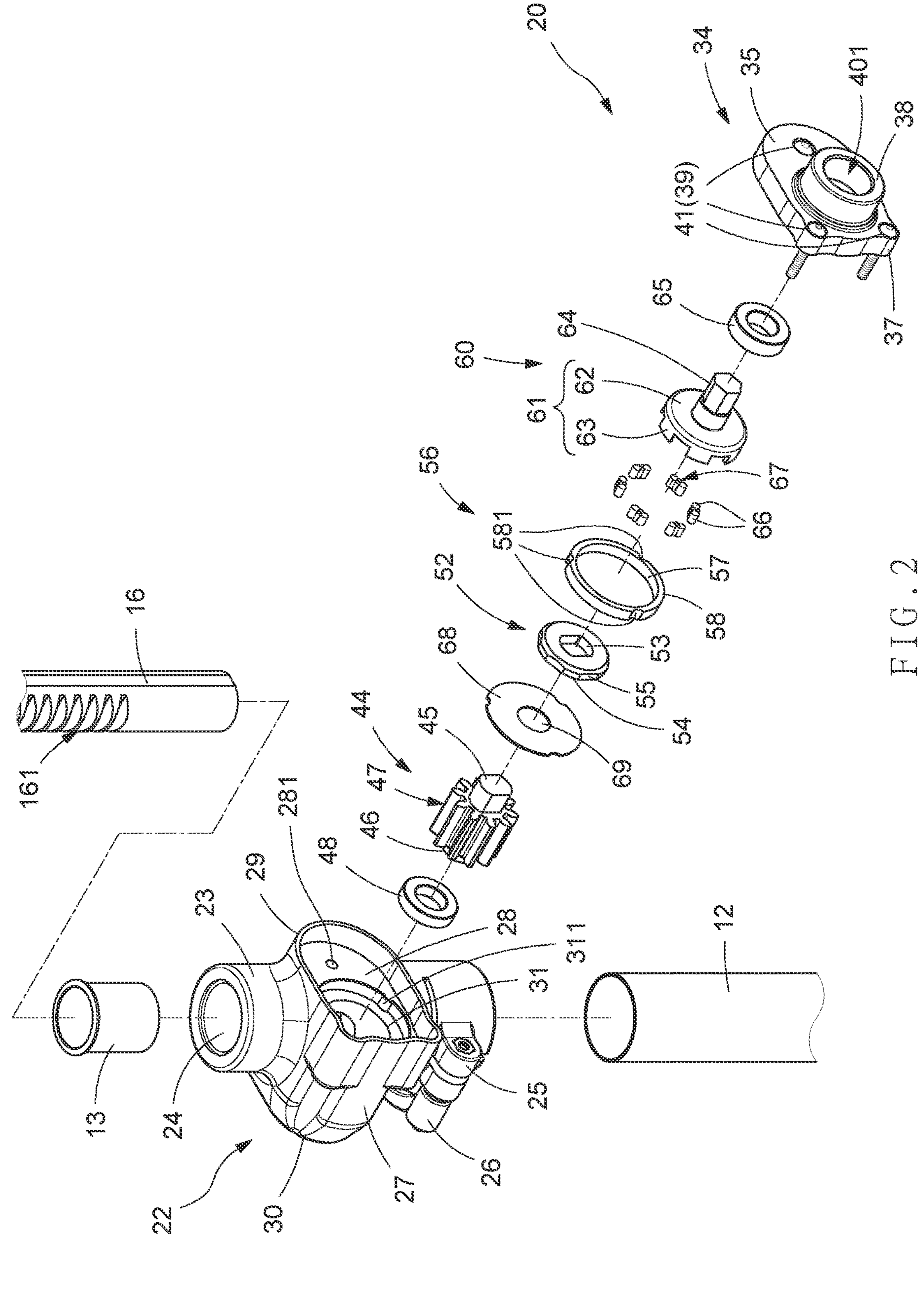
FIG. 2 is a partially exploded view of the bicycle repair stand of the first embodiment of the present invention.

Referring to FIGS. 1-2, a bicycle repair stand 1 of a first embodiment of the present invention comprises a supporting rod 10 and a lifting device 20.

As shown in FIG. 1, the supporting rod 10 includes a connecting tube 11, a sleeve tube 12 located below the connecting tube 11, and a bushing 13 located between the connecting tube 11 and the sleeve tube 12. A clamp 14 is provided at the top end of the connecting tube 11 for allowing a user to clamp a bicycle (not shown) to facilitate maintenance. An expandable and retractable tripod 15 is pivotally connected to the bottom end of the sleeve tube 12 for firmly supporting on the ground. The supporting rod 10 further has a gear rack 16 provide with a first teeth portion 161. The gear rack 16 is penetrated in the connecting tube 11, the sleeve tube 12, and the bushing 13, and moved relative to the sleeve tube 12 and the bushing 13.

Figure 3:
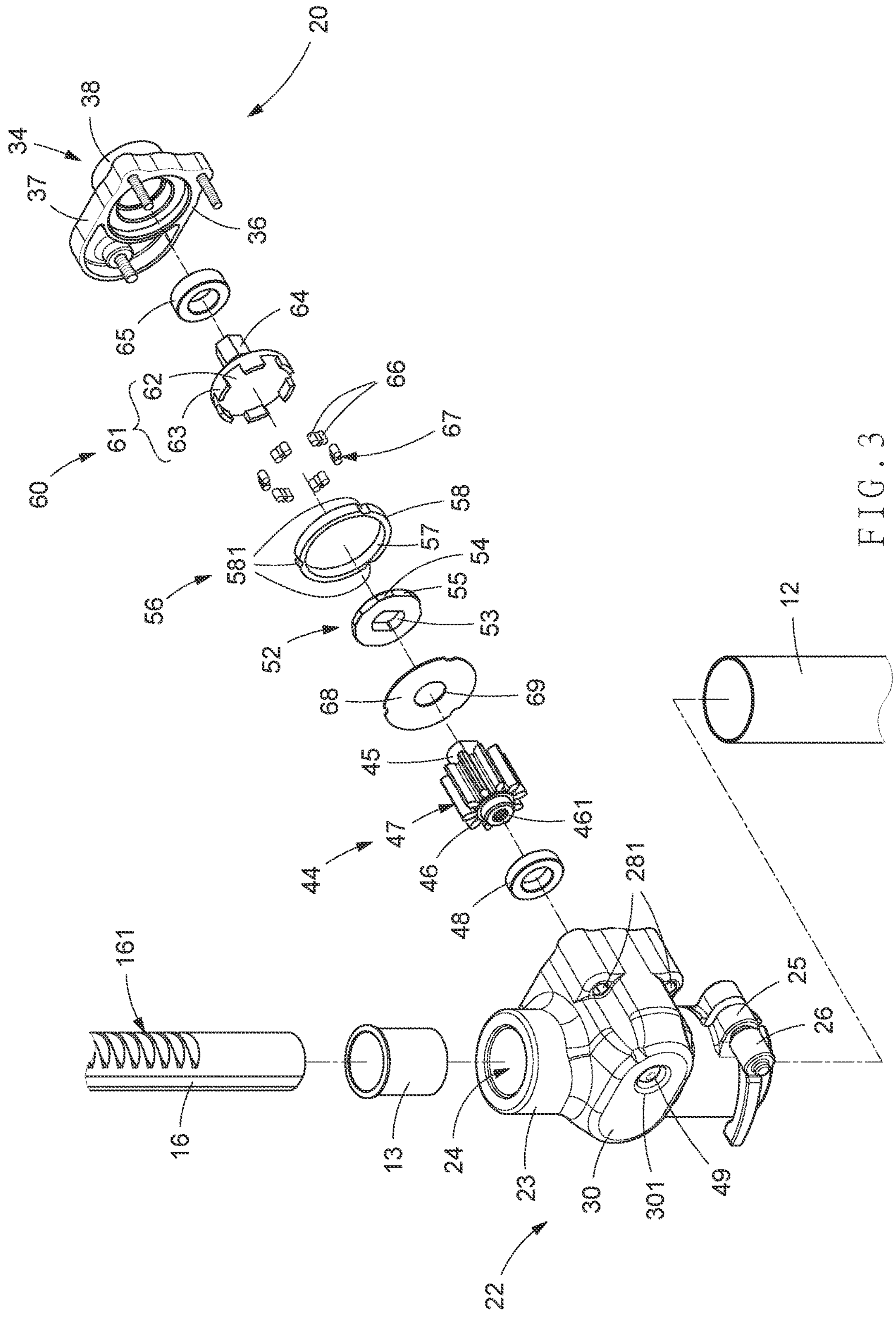
FIG. 3 is a partially exploded view of the bicycle repair stand of the first embodiment of the present invention in another perspective.
Figure 4:
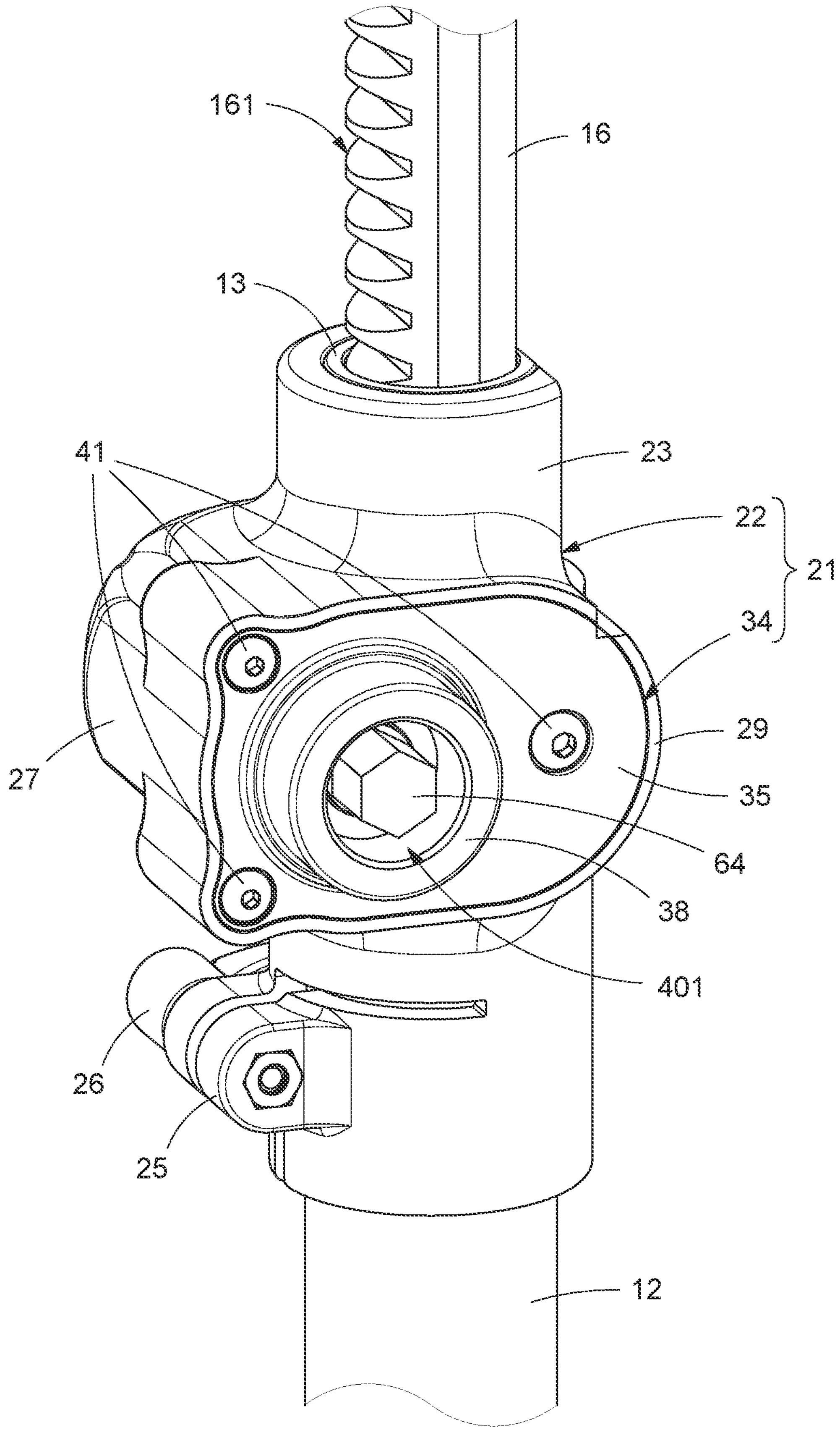
FIG. 4 is a partially perspective view of the bicycle repair stand of the first embodiment of the present invention.
Figure 5:
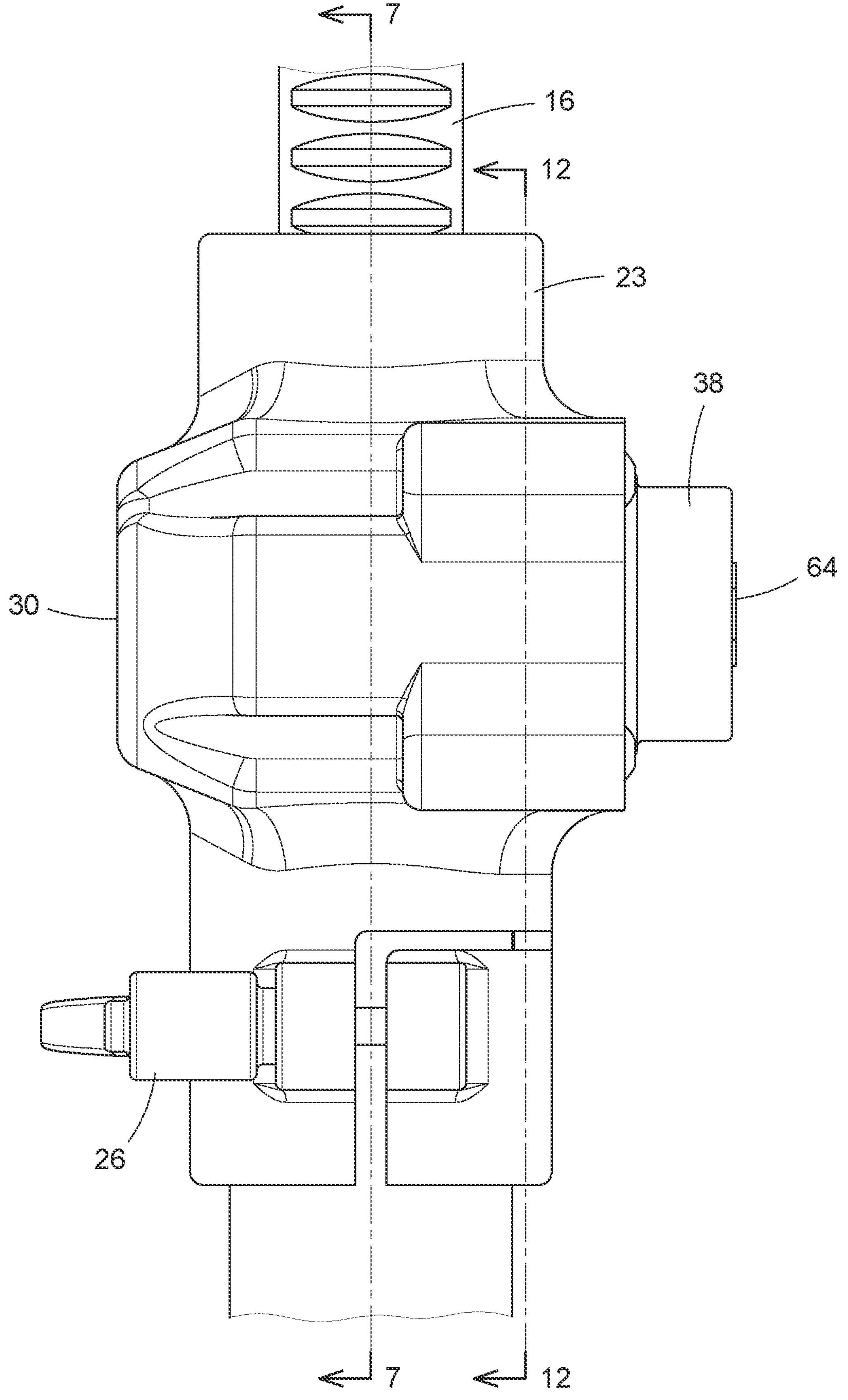
FIG. 5 is a left side view of FIG. 4.
Figure 6:
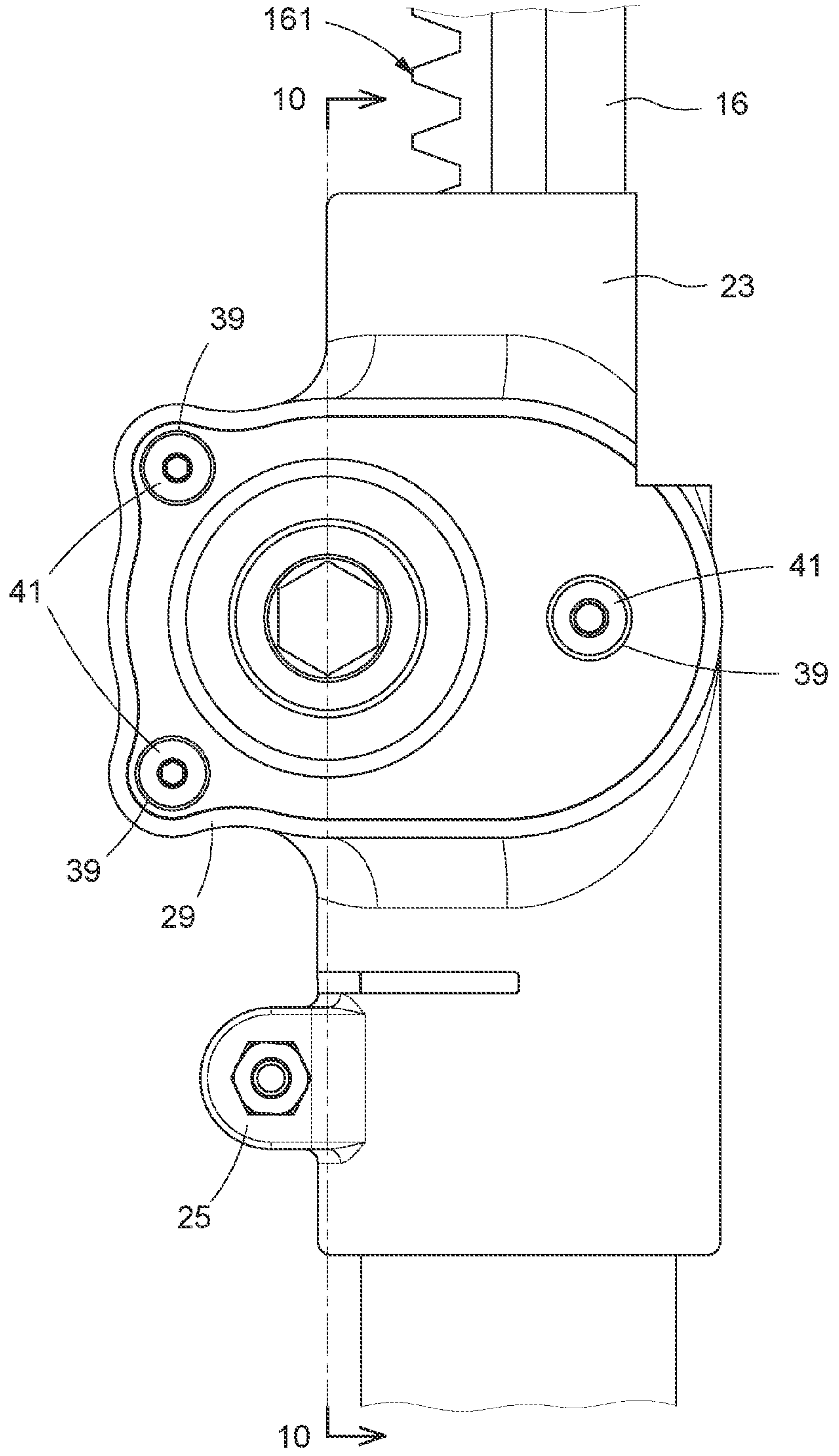
FIG. 6 is a front view of FIG. 4.

Referring to FIGS. 2 to 4, the lifting device 20 includes a shell 21, a gear 44, a first bearing 48, a rotating disk 52, a fixed ring 56, a driving base 60, a second bearing 65, twelve rolling elements 66, six pushing members 67, and a blocking plate 68.

Figure 7:
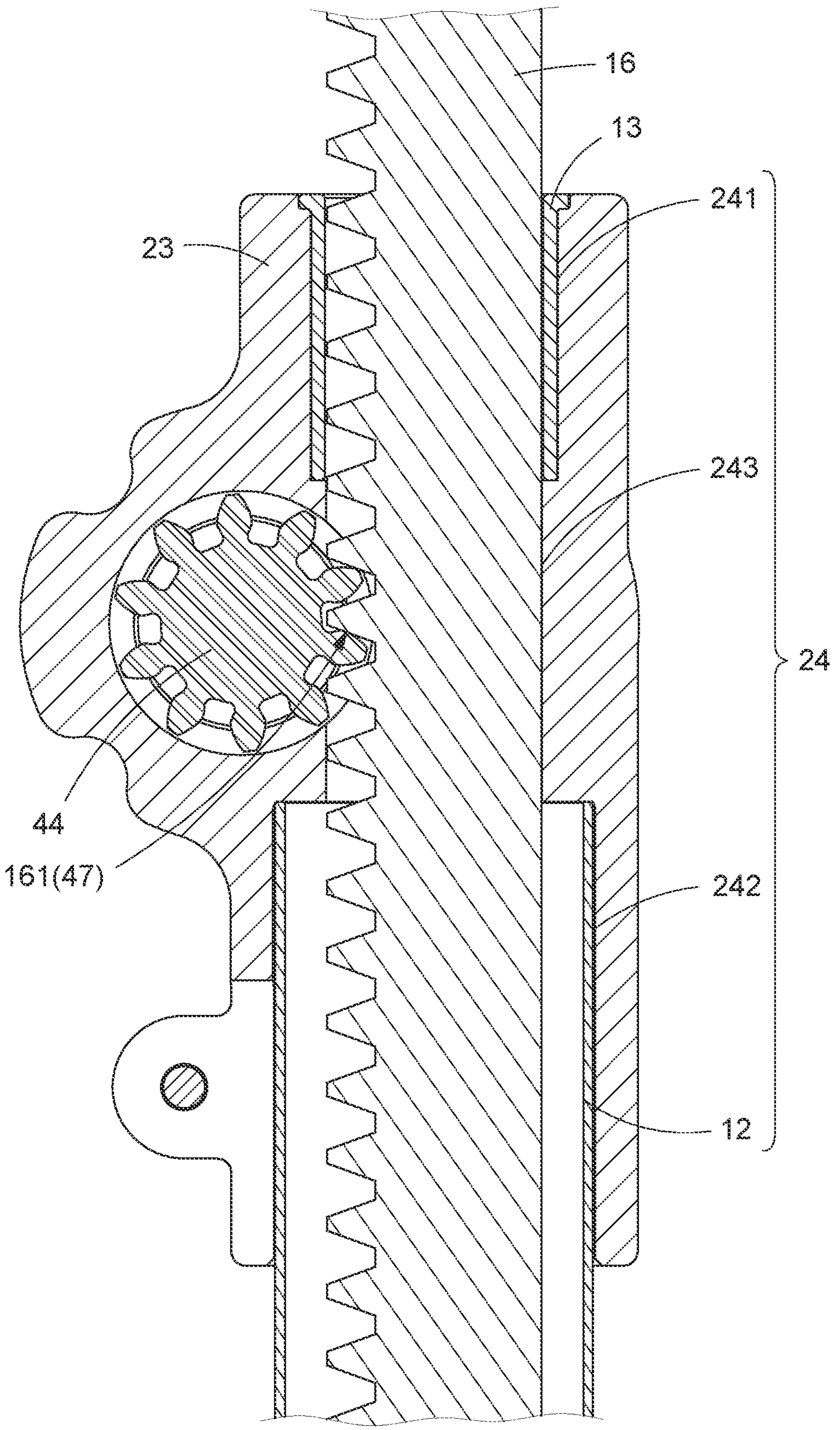
FIG. 7 is a sectional view taken line 7-7 of FIG. 5, showing that the second teeth portion of the gear is meshed with the first teeth portion of the gear rack.
Figure 8:
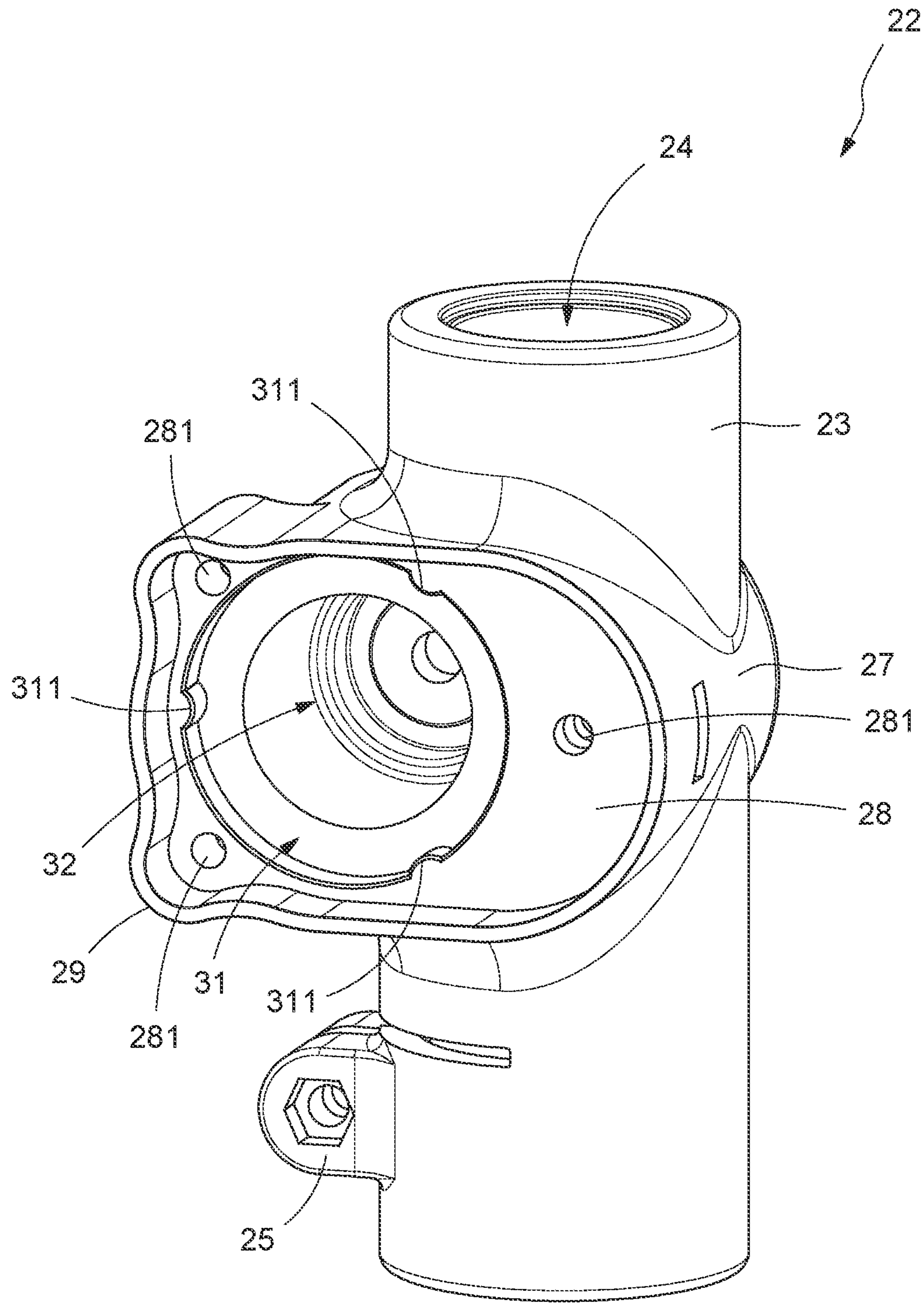
FIG. 8 is a shell body provided by the bicycle repair stand of the first embodiment of the present invention.
Figure 9:
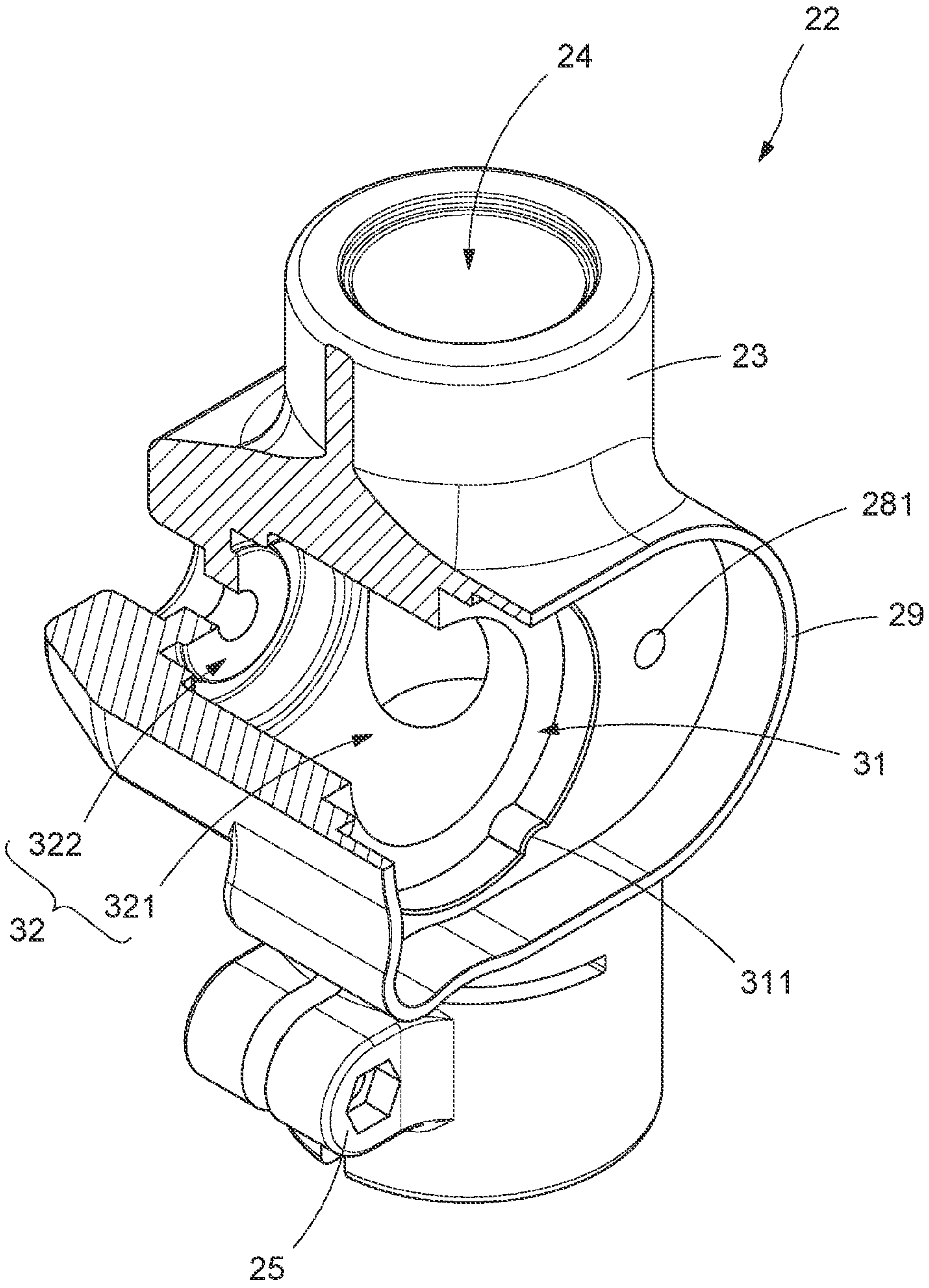
FIG. 9 is partially sectional view of the shell body provided by the bicycle repair stand of the first embodiment of the present invention in another perspective.

Referring to FIGS. 4 to 7, the shell 21 includes a shell body 22 and a lid 34. The shell body 22 has a sleeve portion 23 and a first chamber 24 passing through along the axial direction of the sleeve portion 23. The first chamber 24 has an upper section 241, a lower section 241, and a middle section 243 connecting the upper and lower sections 241, 242. As shown in FIG. 7, the shell body 22 uses the upper section 241 of the first chamber 24 to fit with the bushing 13 on one hand, and on the other hand, the shell body 22 uses the lower section 242 of the first chamber 24 to fit with the top end of the sleeve tube 12, and further, the gear rack 16 is inserted into the upper section 241, the lower section 242, and the middle section 243 of the first chamber 24. As shown in FIGS. 2 to 4, the bottom end of the sleeve portion 23 has a pivot portion 25 and a quick-release component 26 pivotally connected to the pivot portion 25. When an external force is applied to loosen the quick-release component 26, the quick-release component 26 no longer presses the sleeve portion 23, so that the sleeve tube 12 can be easily detached from the bottom end of the sleeve portion 23. Furthermore, as shown in FIGS. 2 and 3, the shell body 22 further has a mounting portion 27 connected to the sleeve portion 23. The mounting portion 27 has a front side 28, a fitting flange 29 surrounding the outer periphery of the front side 28, and a rear side 30 opposite the front side 28. The front side 28 has three spaced lock holes 281 (as shown in FIGS. 8 and 9), and the rear side 30 has a perforation 301 (as shown in FIG. 3). The mounting portion 27 further has an annular groove 31 and an accommodation space 32. As shown in FIGS. 8 and 9, the annular groove 31 is recessed inward from the front side 28, and the inner wall surface of the annular groove 31 has three protrusions 311 arranged in a spaced manner. The accommodation space 32 has a large diameter portion 321 communicating with the annular groove 31 and the first chamber 24, and a small diameter portion 322 communicating with the large diameter portion 321.

Figure 10:
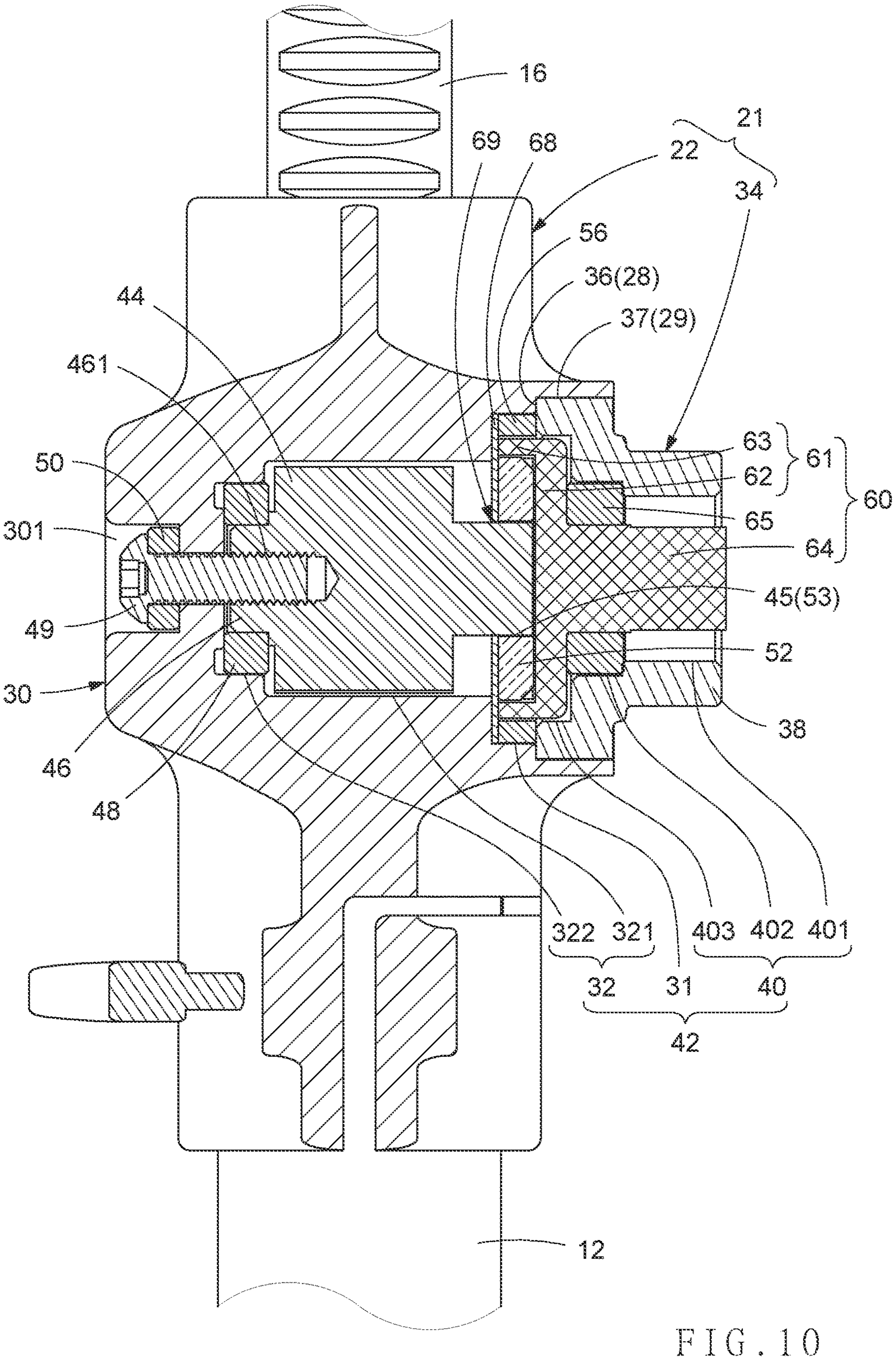
FIG. 10 is a sectional view taken line 10-10 of FIG. 6.

Please refer to FIGS. 2 and 3, the lid 34 has a front side 35, a rear side 36, an outer peripheral surface 37 between the front side 35 and the rear side 36, an insertion portion 38 extending from the front side 35, three lock holes 39 passing through the front side 35 and the rear side 36 and arranged in a spaced manner, and a through hole 40 passing through the front side 35 and the rear side 36 and the insertion portion 38. As shown in FIG. 10, the through hole 40 has an insertion section 401 located at the insertion portion 38, a small annular section 402 communicating with the insertion section 401, and a large annular section 403 communicating with the small annular section 402. As shown in FIG. 10, during actual assembly, the lid 34 uses the outer peripheral surface 37 to press against the fitting flange 29 of the shell body 22 on one hand, and on the other hand, the lid 34 uses the rear side 36 to press against the front side 28 of the shell body 22. Thereafter, three screws 41 are screwed to the lock holes 39 of the lid 34 (as shown in FIG. 2) and the lock holes 281 of the shell body 22 (as shown in FIG. 8), so that the lid 34 is locked to the shell body 22 to form the shell 21 as shown in FIG. 4. At this time, the through hole 40, the annular groove 31, and the accommodation space 32 communicate with each other to form a second chamber 42 (as shown in FIG. 10). The second chamber 42 and the first chamber 24 communicate with each other.

As shown in FIGS. 2 and 3, the gear 44 has a limiting shaft 45, a convex shaft 46 extending in opposite directions to the limiting shaft 45 and having a threaded hole 461, and a second teeth portion 47 located between the limiting shaft 45 and the convex shaft 46. As shown in FIG. 10, the gear 44 is rotatably disposed in the large diameter portion 321 of the accommodation space 32 of the shell body 22 (that is, in the second chamber 42 of the shell 21), and the gear 44 uses the second teeth portion 47 to be meshed with the first teeth portion 161 of the gear rack 16 (as shown in FIG. 7).

As shown in FIG. 10, the first bearing 48 is sleeved on the convex shaft 46 of the gear 44 and received in the small diameter portion 322 of the accommodation space 32 of the shell body 22. A screw 49 is penetrated through the perforation 301 of the rear side 30 of the shell body 22 and a washer 50, and screwed to the threaded hole 461 of the convex shaft 46 of the gear 44, so that the gear 44 and the first bearing 48 are pivoted together.

Figure 11:
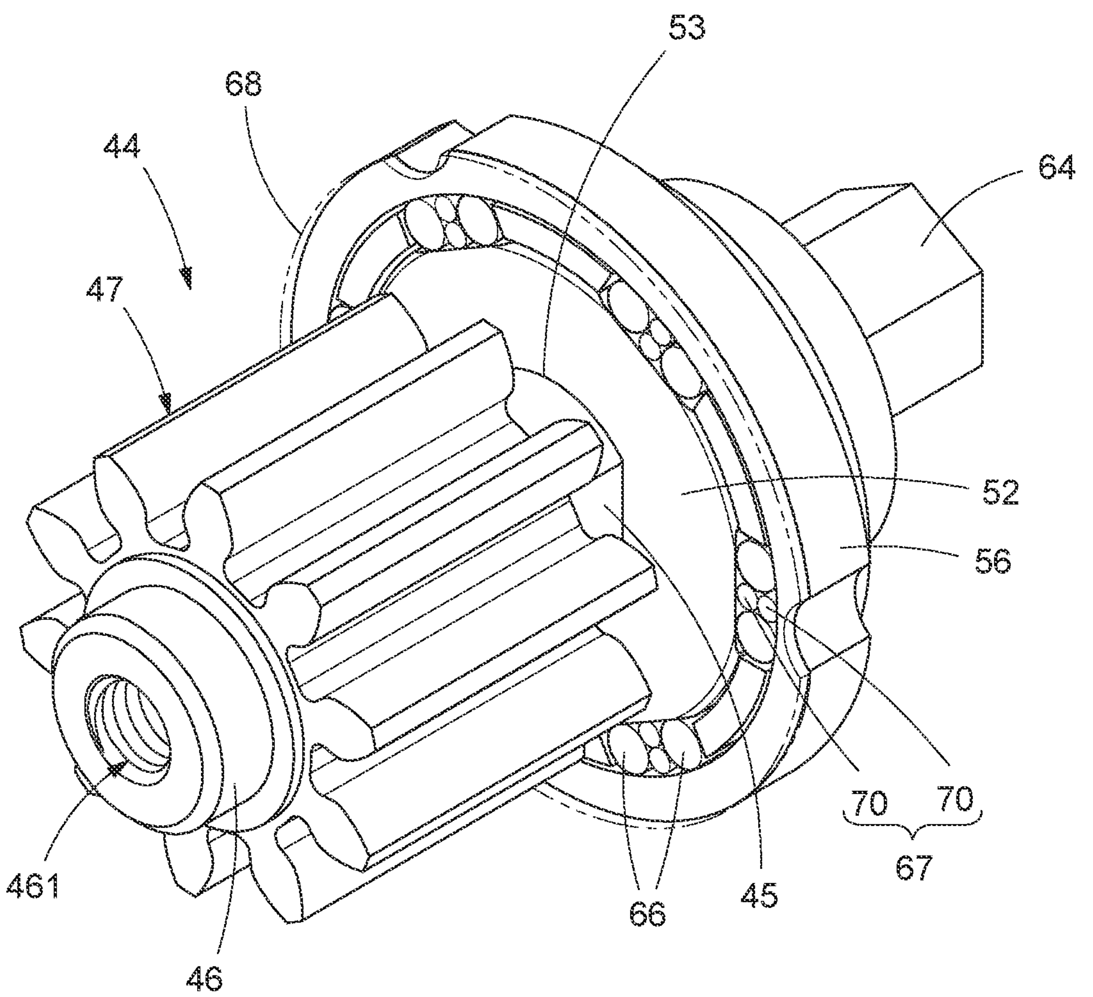
FIG. 11 is a perspective view of some components provided by the bicycle repair stand of the first embodiment of the present invention, showing that the blocking plate covers the annular space and the insertion space.
Figure 12:
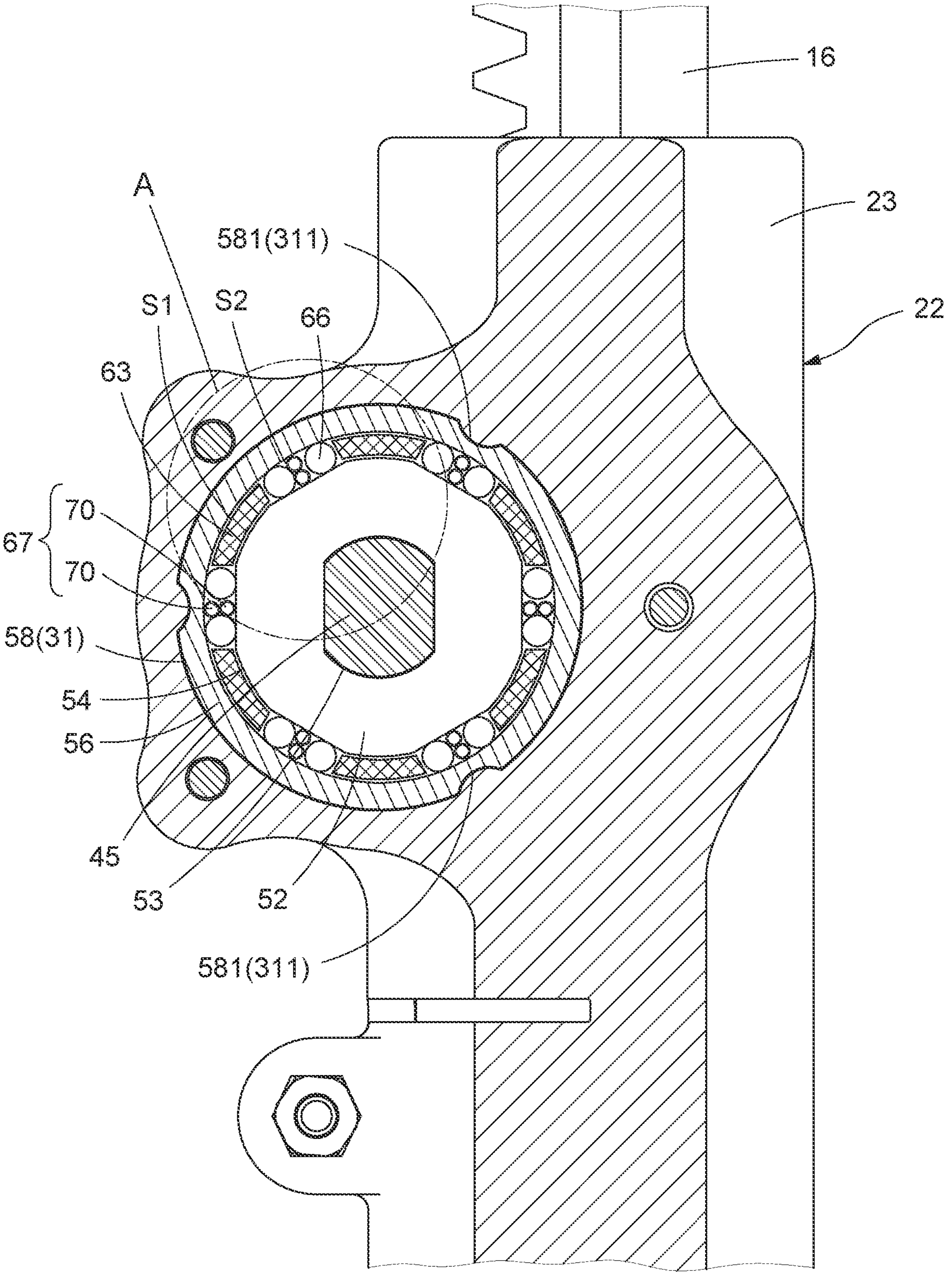
FIG. 12 is a sectional view taken along line 12-12 of FIG. 5, showing that the fixed ring is mounted in the shell body.

Please refer to FIGS. 2 and 3, the rotating disk 52 has a limiting hole 53 and an arc-shaped outer peripheral surface 54. The outer peripheral surface 54 has six tangent planes 55 arranged at equal intervals with respect to the limiting hole 53 (as shown in FIG. 12). As shown in FIGS. 10 to 12, the rotating disk 52 is accommodated in the annular groove 31 of the shell body 22 (that is, in the second chamber 42 of the shell 21), and fitted with limiting shaft 45 of the gear 44 through the limiting hole 53, so that the rotating disk 52 is coaxially connected to the gear 44.

As shown in FIGS. 2 and 3, the fixing ring 56 has an inner wall surface 57 and an outer wall surface 58. The outer wall surface 58 has three concavities 581 arranged in a spaced manner. As shown in FIG. 10, the fixed ring 56 is accommodated in the annular groove 31 of the shell body 22 (that is, in the second chamber 42 of the shell 21), and the fixed ring 56 uses the concavities 581 to be engaged with the convexities 311 of the shell 21, so that the fixed ring 56 is firmly fixed in the annular groove 31 (as shown in FIG. 12). Please refer to FIGS. 12 and 13, the fixed ring 56 surrounds the outer peripheral surface 54 of the rotating disk 52, so that an annular space S1 is formed between the inner wall surface 57 of the fixed ring 56 and the outer peripheral surface 54 of the rotating disk 52. A first spacing D1 is defined between the inner wall surface 57 of the fixed ring 56 and the tangent plane 55 of the rotating disk 52, and a second spacing D2 is defined between the inner wall surface 57 of the fixed ring 56 and the outer peripheral surface 54 of the rotating disk 52.

Figure 13:
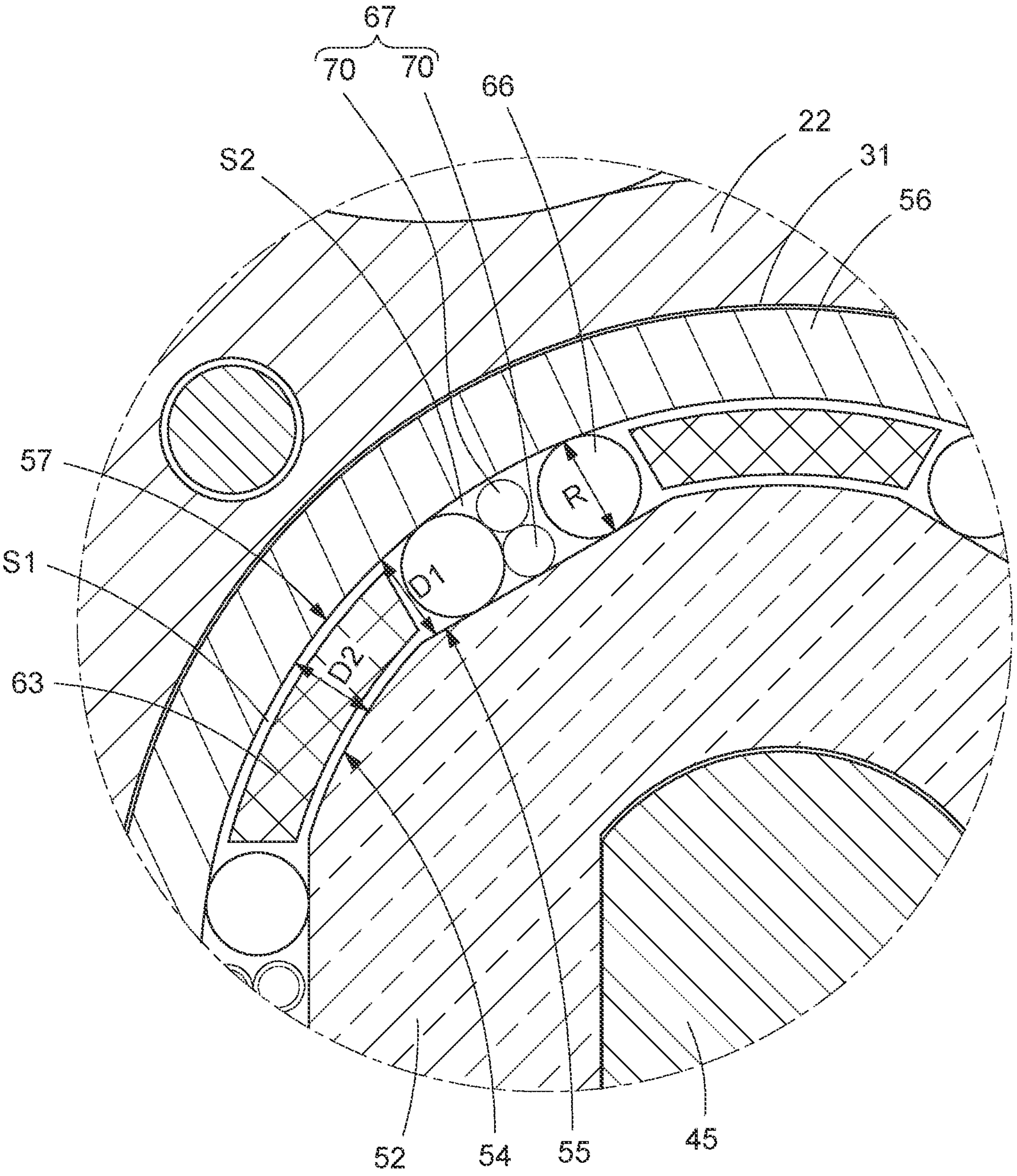
FIG. 13 is an enlarged view of part A of FIG. 12.

As shown in FIG. 10, the driving base 60 is rotatably disposed in the shell 21. As shown in FIGS. 2 and 3, the driving base 60 has a disk portion 61 and a shaft portion 64 extending from the disk portion 61. The disk portion 61 has a bearing plate 62 and six pushing protrusions 63 provided on the outer periphery of the bearing plate 62 and arranged at equal intervals respect with the shaft portion 64. As shown in FIG. 10, the bearing plate 62 of the disk portion 61 is accommodated in the large annular section 403 of the through hole 40 of the lid 34 (that is, in the second chamber 42 of the shell 21). The bearing plate 62 of the disk portion 61 is abutted against the front side of the rotating disk 52 on one hand, and on the other hand, the pushing protrusions 63 of the disk portion 61 are rotatably inserted into the annular space S1, so that an insertion space S2 (as shown in FIGS. 12 and 13) is formed between one of the pushing protrusions 63, the inner wall surface 57 of the fixed ring 56, and one of the tangent planes 55 of the rotating disk 55. The shaft portion 64 is inserted into the insertion section 401 of the through hole 40 of the lid 34, and partially exposed from the insertion portion 38 of the lid 34 (as shown in FIGS. 4 and 10).

As shown in FIG. 10, the second bearing 65 is sleeved on the shaft portion 64 of the driving base 60 and accommodated in the small annular section 402 of the through hole 40 of the lid 34.

The rolling elements 66 are rollers in this embodiment. As shown in FIGS. 12 and 13, the rolling elements 66 are accommodated in each of the insertion spaces S2 in pairs. The diameter R of the rolling element 66 is approximately equal to the first spacing D1 and larger than the second spacing D2.

In this embodiment, as shown in FIGS. 12 and 13, the pushing member 67 is formed by two rollers 70 arranged in a stacked manner and accommodated in the insertion space S2.

As shown in FIGS. 2 and 3, the blocking plate 68 has a sleeve hole 69. As shown in FIGS. 10 and 11, the blocking plate 68 is received in the annular groove 31 of the shell body 22. The blocking plate 68 is fitted to the limiting shaft 45 of the gear 44 through the sleeve hole 69, and the blocking plate 68 is abutted against the rear side of the fixed ring 56 and the rear side of the rotating disk 52 to cover the annular space S1 and the insertion space S2. In this way, the blocking plate 68 is used to prevent the rolling elements 66 and the pushing members 67 from falling from the insertion space S2 (as shown in FIG. 11).

The above is the structure of the bicycle repair stand 1 of the present invention, and the usage of the bicycle repair stand 1 of the present invention is further introduced below.

Figure 14:
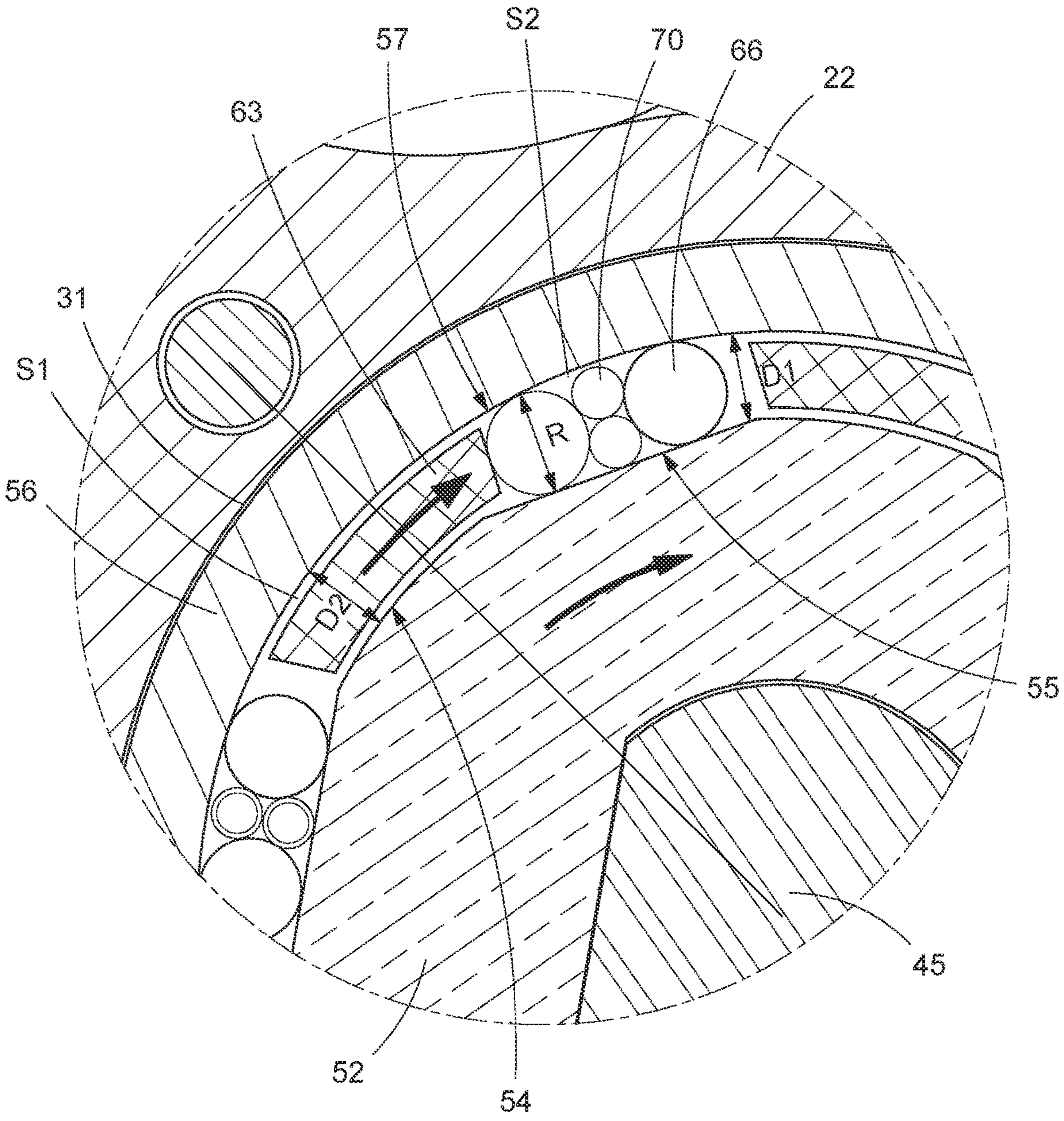
FIG. 14 is similar to FIG. 13, showing that the pushing protrusions are rotated in a clockwise direction.

In actual use, if the user would like lower the height of the gear rack 16, as shown in FIG. 4, a ratchet wrench (not shown) is inserted into the insertion portion 38 of the lid 34 and sleeved on the shaft portion 64 of the driving base 60 first. Then, an external force is applied to rotate the shaft portion 64 of the driving base 60 in a clockwise direction, so that the shaft portion 64 of the driving base 60 drives the pushing protrusions 63 of the disk portion 61 to rotate in a clockwise direction, causing the pushing protrusions 63 to move from the position as shown in FIG. 13 to the position as shown in FIG. 14. At this time, as shown in FIG. 14, each pushing protrusion 63 pushes against one rolling element 66 located in the insertion space S2 to move towards the other rolling element 66, so that the rollers 70 are abutted against the rolling elements 66. Since the diameter R of each rolling element 66 is approximately equal to the first spacing D1 and greater than the second spacing D2, the rolling elements 66 push against the inner wall surface 57 of the fixed ring 56 and the tangent planes 55 of the rotating disk 52, so that the rolling elements 66 drive the rotating disk 52 to rotate relative to the fixed ring 56 in a clockwise direction, and also drive the gear 44 as shown in FIG. 7 to rotate in a clockwise direction. This causes that the gear 44 drives the gear rack 16 to move downwards relative to the sleeve tube 12 to lower the height of the gear rack 16. Once the gear rack 16 is adjusted to a suitable height, the ratchet wrench is no longer used to rotate the shaft portion 64 of the drive base 60. At this time, each pushing protrusion 63 and each rolling element 66 return to the position as shown in FIG. 13 from the position as shown in FIG. 14 by a push force generated by the relative rotation of the rollers 70, so that the rotating disk 52 stops rotating, causing that the gear 44 no longer drives the gear rack 16 to move downwards relative to the sleeve tube 12. In this way, the height adjustment of the gear rack 16 is completed.

Figure 15:
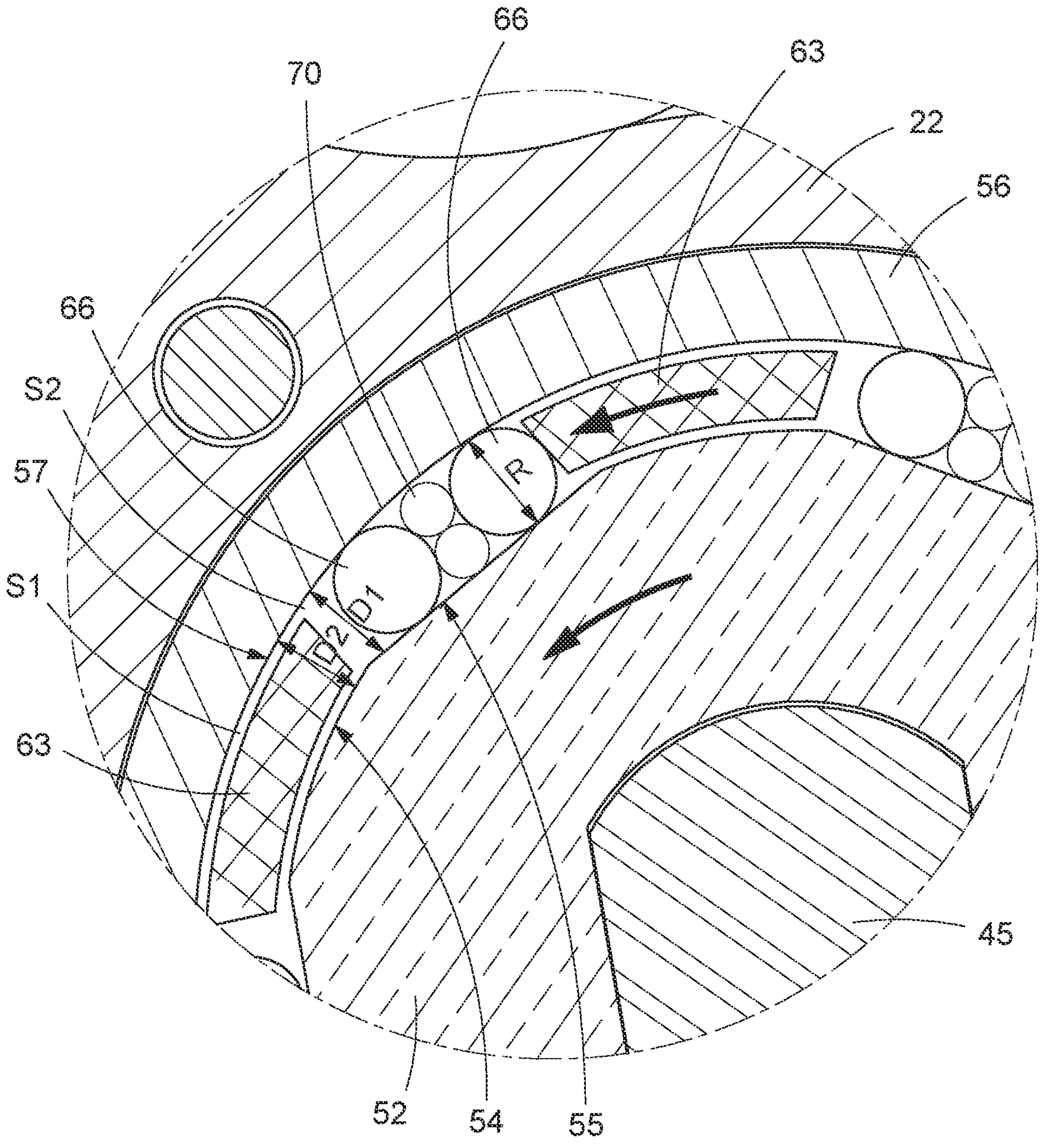
FIG. 15 is similar to FIG. 13, showing that the pushing protrusions are rotated in a counterclockwise direction.

On the contrary, if the user would like to raise the height of the gear rack 16, the ratchet wrench is used to rotate the shaft portion 64 of the driving base 60 in a counterclockwise direction, so that the shaft portion 64 of the driving base 60 drives the pushing protrusions 63 of the disk portion 61 to rotate in a counterclockwise direction, causing the pushing protrusions 63 to move from the position as shown in FIG. 13 to the position as shown in FIG. 15. At this time, as shown in FIG. 15, each pushing protrusion 63 pushes against one rolling element 66 located in the insertion space S2 to move towards the other rolling element 66, so that the rollers 70 are abutted against the rolling elements 66. Since the diameter R of each rolling element 66 is approximately equal to the first spacing D1 and greater than the second spacing D2, the rolling elements 66 push against the inner wall surface 57 of the fixed ring 56 and the tangent planes 55 of the rotating disk 52, so that the rolling elements 66 drive the rotating disk 52 to rotate relative to the fixed ring 56 in a counterclockwise direction, and also drive the gear 44 to rotate in a counterclockwise direction. This causes that the gear 44 drives the gear rack 16 to move upwards relative to the sleeve tube 12 to raiser the height of the gear rack 16. Once the gear rack 16 is adjusted to a suitable height, the ratchet wrench is no longer used to rotate the shaft portion 64 of the driving base 60. At this time, each pushing protrusion 63 and each rolling element 66 return to the position as shown in FIG. 13 from the position as shown in FIG. 15 by the push force generated by the relative rotation of the rollers 70, so that the rotating disk 52 stops rotating, causing that the gear 44 no longer drives the gear rack 16 to move upwards relative to the sleeve tube 12. In this way, the height adjustment of the gear rack 16 is completed.

Figure 16:
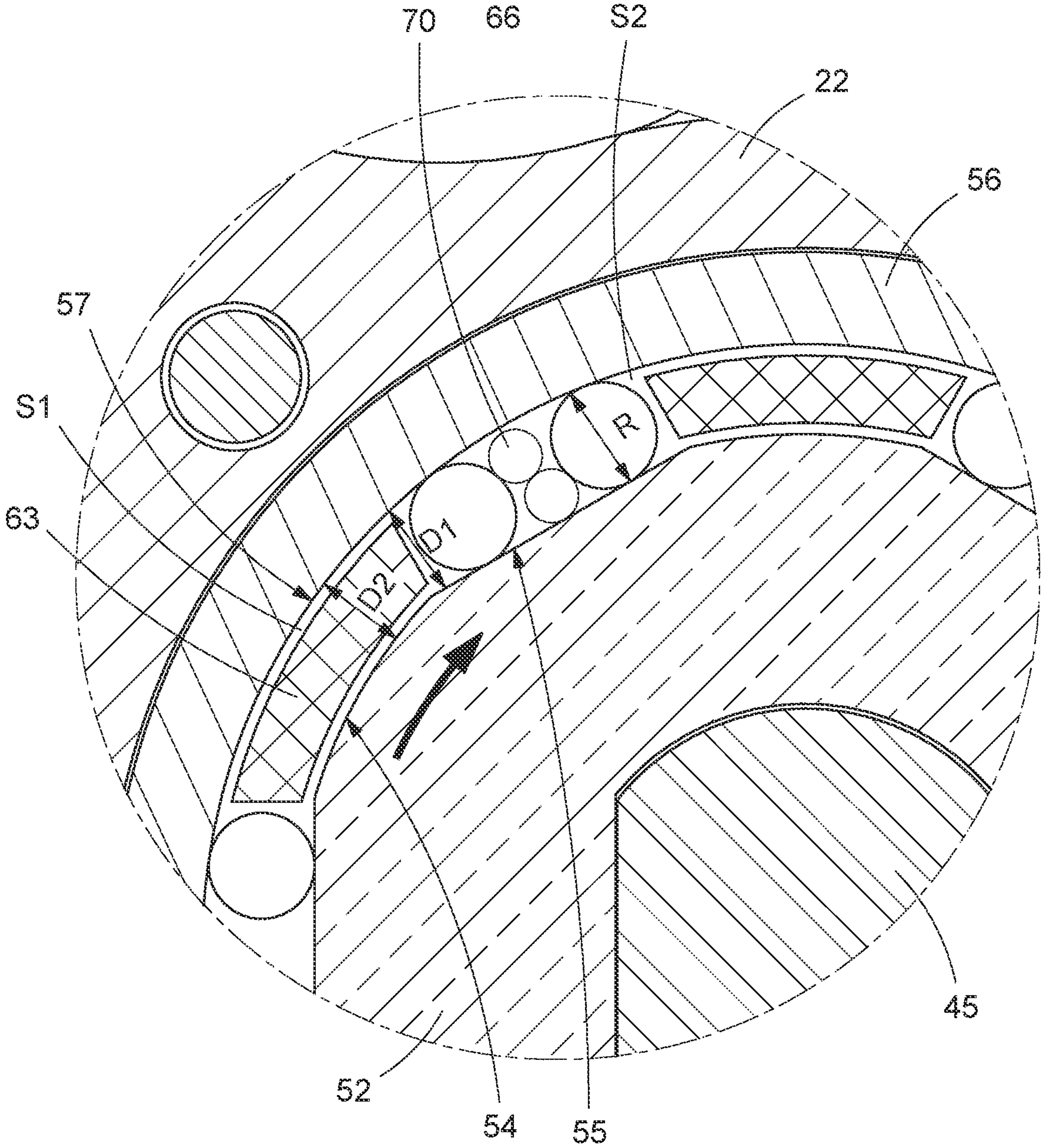
FIG. 16 is similar to FIG. 13, showing that the tangent plane of the rotating disk is abutted against the rolling elements.

Furthermore, as shown in FIG. 1, if the weight of the bicycle clamped on the clamp 14 is too heavy, the bicycle exerts a downward pressure on the gear rack 16, and the downward force is transmitted to the rotating disk 52 through the first teeth portion 161 of the gear rack 16 and the second teeth portion 47 of the gear 44, so that the rotating disk 52 is rotated slightly in a clockwise direction. As shown in FIG. 16, the interface between the outer peripheral surface 54 and the tangent plane 55 of the rotating disk 52 is abutted against one rolling element 66 located in the insertion space S2, so that the rolling elements 66 are pressed against the inner wall surface 57 of the fixed ring 56. This causes that the rotating disk 52 is unable to rotate relative to the fixed ring 56, so the gear rack 16 cannot be moved downwards relative to the sleeve tube 12. In this way, the danger of rapid falling of the gear rack 16 can be avoided.

Figure 17:
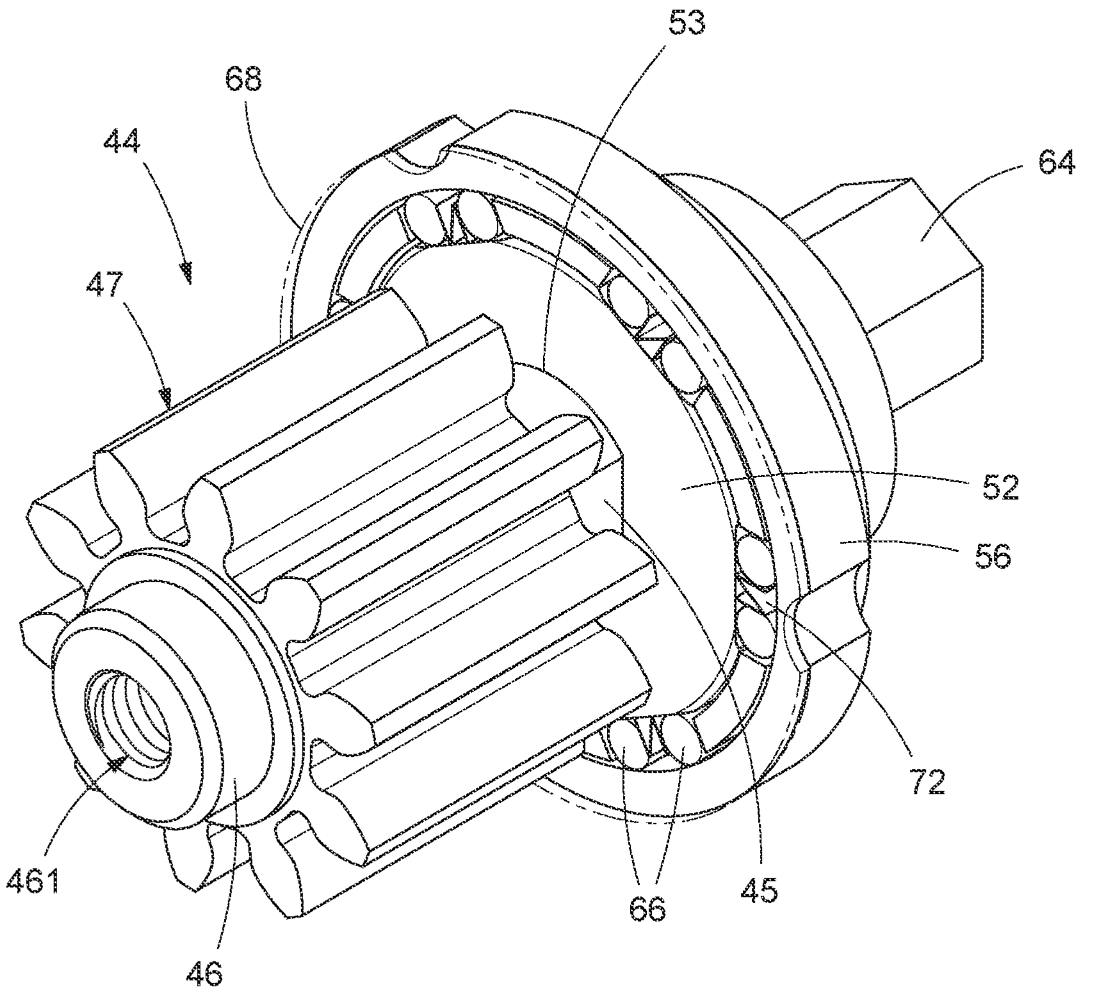
FIG. 17 is similar to FIG. 11, showing that the pushing member provided by the bicycle repair stand of a second embodiment of the present invention is disposed between the rolling elements.

As shown in FIG. 17, the main structure of the bicycle repair stand provided by a second embodiment of the present invention is approximately the same with the first embodiment, but one of the differences therebetween lies in the structure of the pushing member 72.

Figure 18:
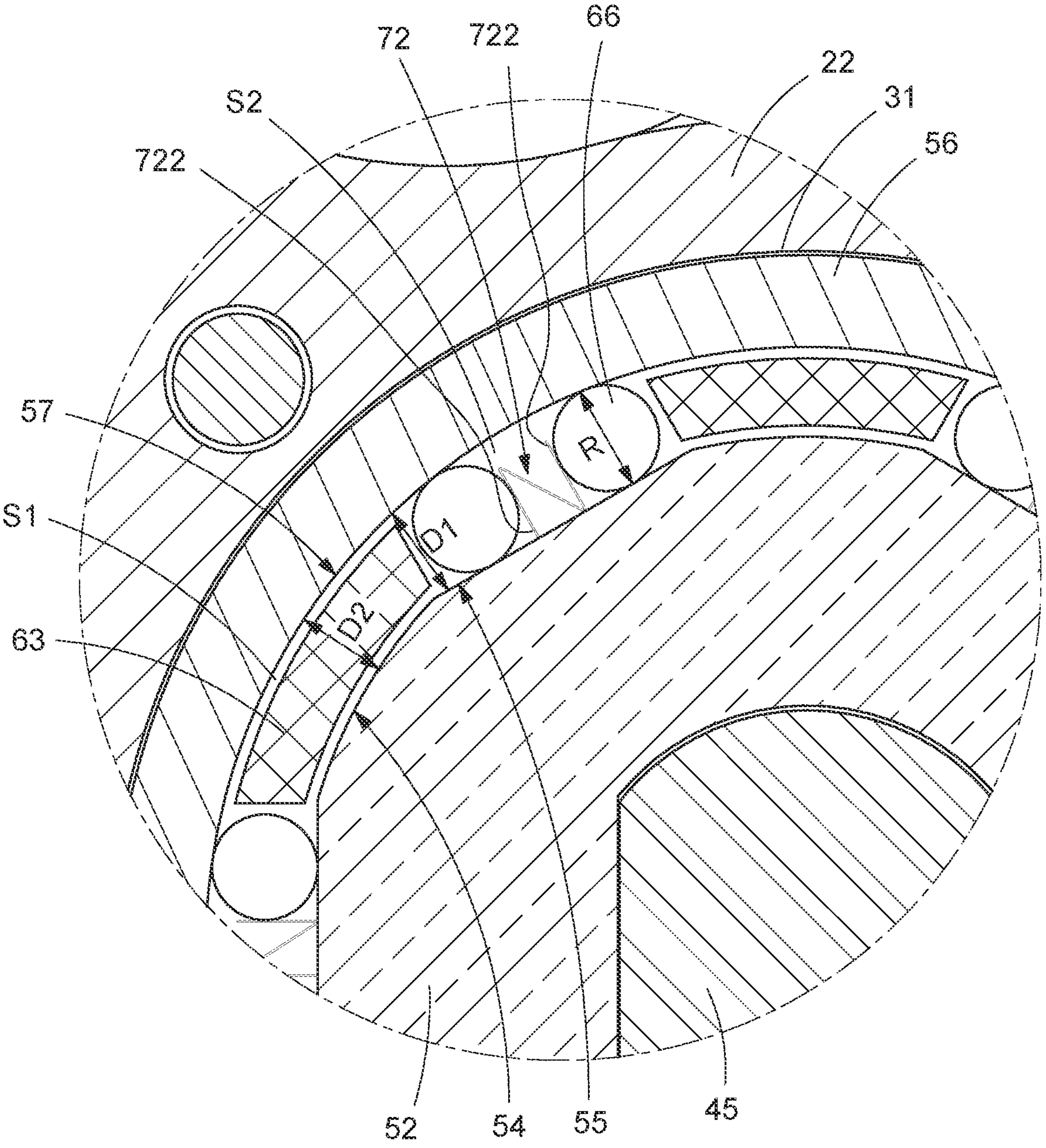
FIG. 18 is similar to FIG. 13, showing that the spring is disposed between the rolling elements.

In this embodiment, the pushing member 72 is a Z-type spring sheet. As shown in FIG. 18, the pushing member 72 is accommodated in the insertion space S2, and has two ends 722 thereof abutted against one pair of the rolling elements 66.

Figure 19:
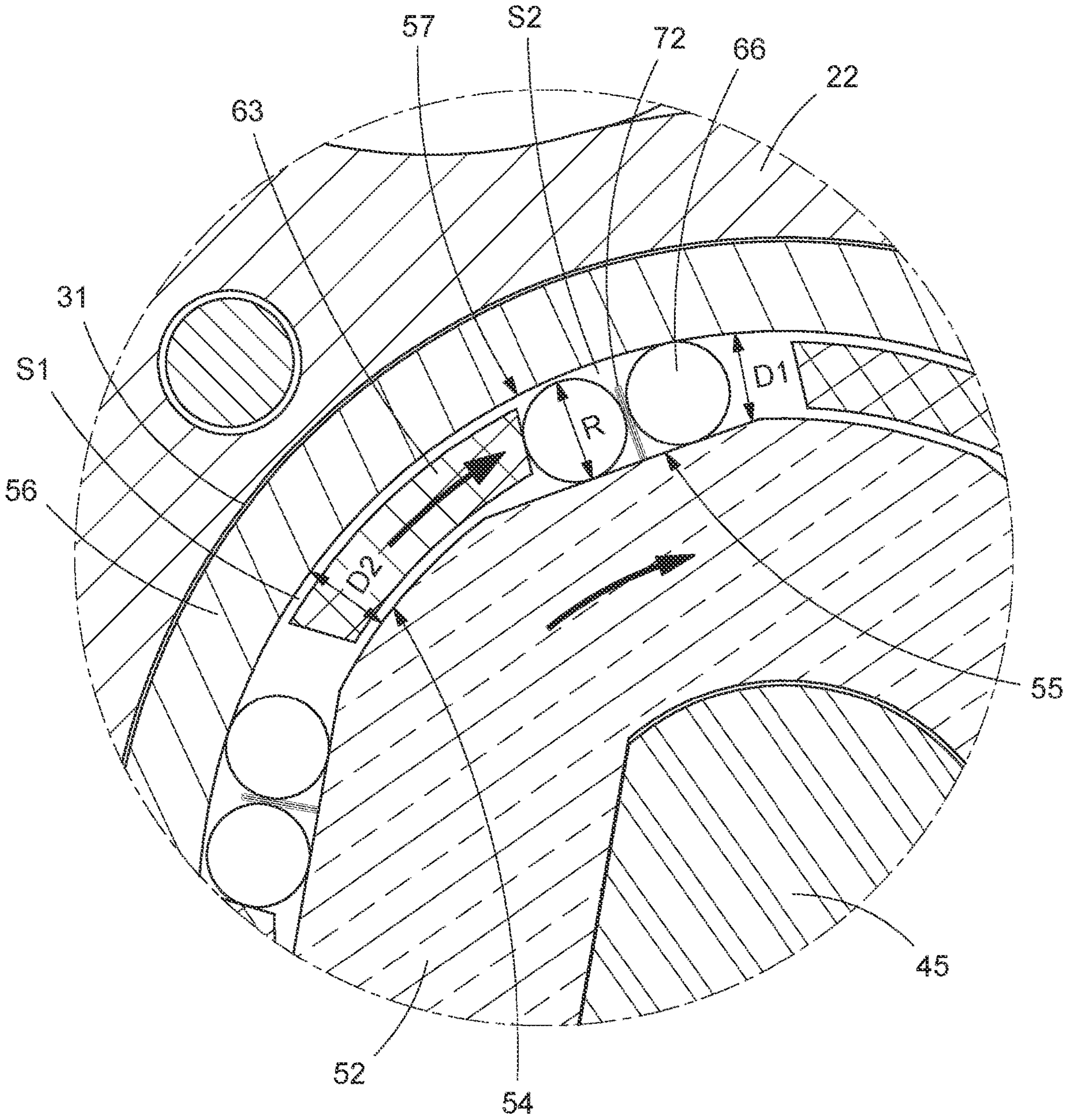
FIG. 19 is similar to FIG. 18, showing that the pushing protrusions are rotated in a clockwise direction.

In actual use, if the user would like lower the height of the gear rack 16, as shown in FIG. 4, a ratchet wrench (not shown) is inserted into the insertion portion 38 of the lid 34 and sleeved on the shaft portion 64 of the driving base 60 first. Then, an external force is applied to rotate the shaft portion 64 of the driving base 60 in a clockwise direction, so that the shaft portion 64 of the driving base 60 drives the pushing protrusions 63 of the disk portion 61 to rotate in a clockwise direction, causing the pushing protrusions 63 to move from the position as shown in FIG. 18 to the position as shown in FIG. 19. At this time, as shown in FIG. 19, each pushing protrusion 63 pushes against one rolling element 66 located in the insertion space S2 to move towards the other rolling element 66, so that the pushing member 72 (Z-type spring sheet) is compressed by the rolling elements 66 to accumulate an elastic force. Since the diameter R of each rolling element 66 is approximately equal to the first spacing D1 and greater than the second spacing D2, the rolling elements 66 push against the inner wall surface 57 of the fixed ring 56 and the tangent planes 55 of the rotating disk 52, so that the rolling elements 66 drive the rotating disk 52 to rotate relative to the fixed ring 56 in a clockwise direction, and also drive the gear 44 as shown in FIG. 7 to rotate in a clockwise direction. This causes that the gear 44 drives the gear rack 16 to move downwards relative to the sleeve tube 12 to lower the height of the gear rack 16. Once the gear rack 16 is adjusted to a suitable height, the ratchet wrench is no longer used to rotate the shaft portion 64 of the drive base 60. At this time, each pushing protrusion 63 and each rolling element 66 return to the position as shown in FIG. 18 from the position as shown in FIG. 19 by the elastic force of the pushing member 72 (Z-type spring sheet), so that the rotating disk 52 stops rotating, causing that the gear 44 no longer drives the gear rack 16 to move downwards relative to the sleeve tube 12. In this way, the height adjustment of the gear rack 16 is completed.

Figure 20:
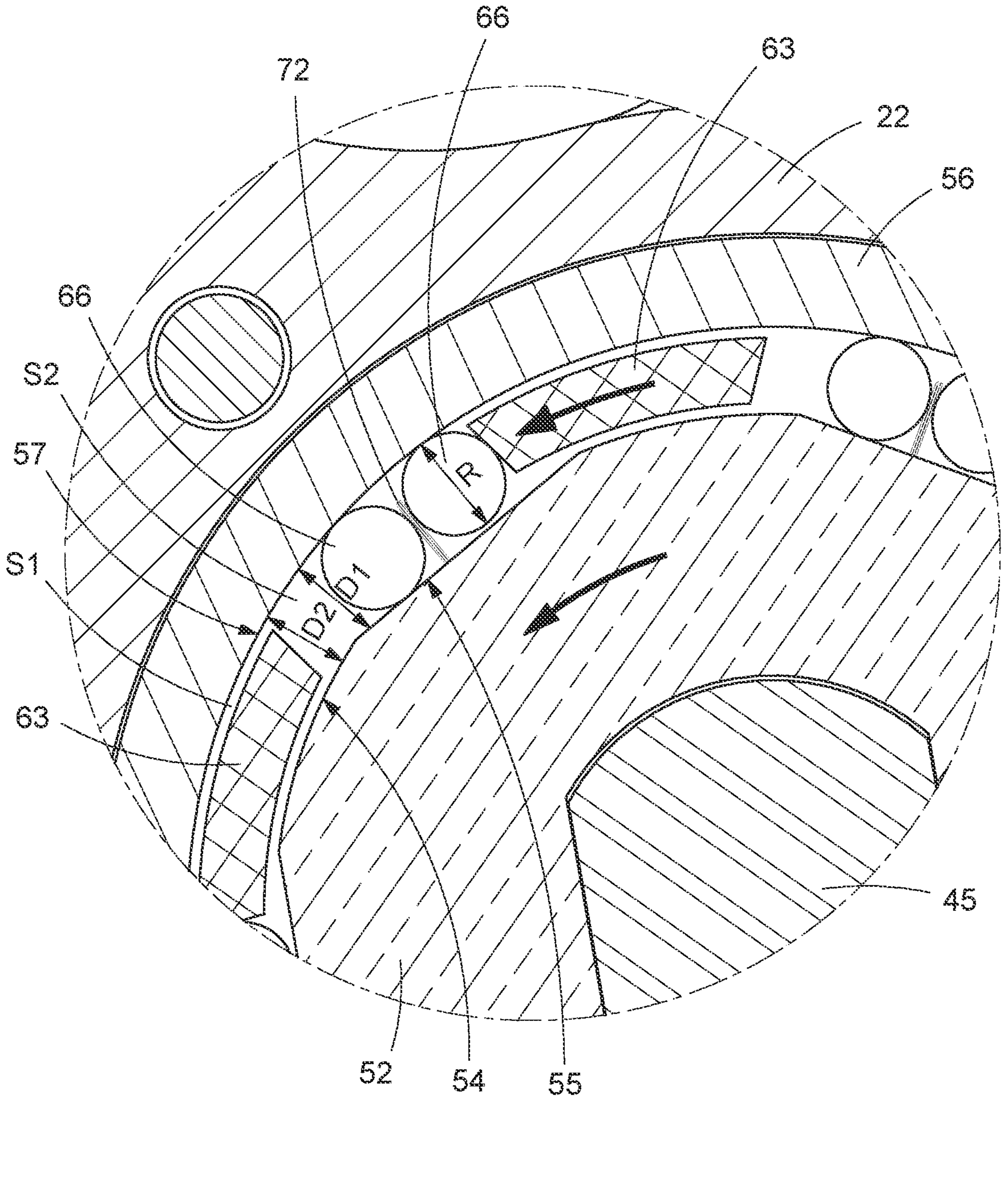
FIG. 20 is similar to FIG. 18, showing that the pushing protrusions are rotated in a counterclockwise direction.

On the contrary, if the user would like to raise the height of the gear rack 16, the ratchet wrench is used to rotate the shaft portion 64 of the driving base 60 in a counterclockwise direction, so that the shaft portion 64 of the driving base 60 drives the pushing protrusions 63 of the disk portion 61 to rotate in a counterclockwise direction, causing the pushing protrusions 63 to move from the position as shown in FIG. 18 to the position as shown in FIG. 20. At this time, as shown in FIG. 20, each pushing protrusion 63 pushes against one rolling element 66 located in the insertion space S2 to move towards the other rolling element 66, so that the pushing member 72 (Z-type spring sheet) is compressed by the rolling elements 66 to accumulate an elastic force. Since the diameter R of each rolling element 66 is approximately equal to the first spacing D1 and greater than the second spacing D2, the rolling elements 66 push against the inner wall surface 57 of the fixed ring 56 and the tangent planes 55 of the rotating disk 52, so that the rolling elements 66 drive the rotating disk 52 to rotate relative to the fixed ring 56 in a counterclockwise direction, and also drive the gear 44 to rotate in a counterclockwise direction. This causes that the gear 44 drives the gear rack 16 to move upwards relative to the sleeve tube 12 to raiser the height of the gear rack 16. Once the gear rack 16 is adjusted to a suitable height, the ratchet wrench is no longer used to rotate the shaft portion 64 of the drive base 60. At this time, each pushing protrusion 63 and each rolling element 66 return to the position as shown in FIG. 18 from the position as shown in FIG. 20 by the elastic force of the pushing member 72 (Z-type spring sheet), so that the rotating disk 52 stops rotating, causing that the gear 44 no longer drives the gear rack 16 to move upwards relative to the sleeve tube 12. In this way, the height adjustment of the gear rack 16 is completed.

Figure 21:
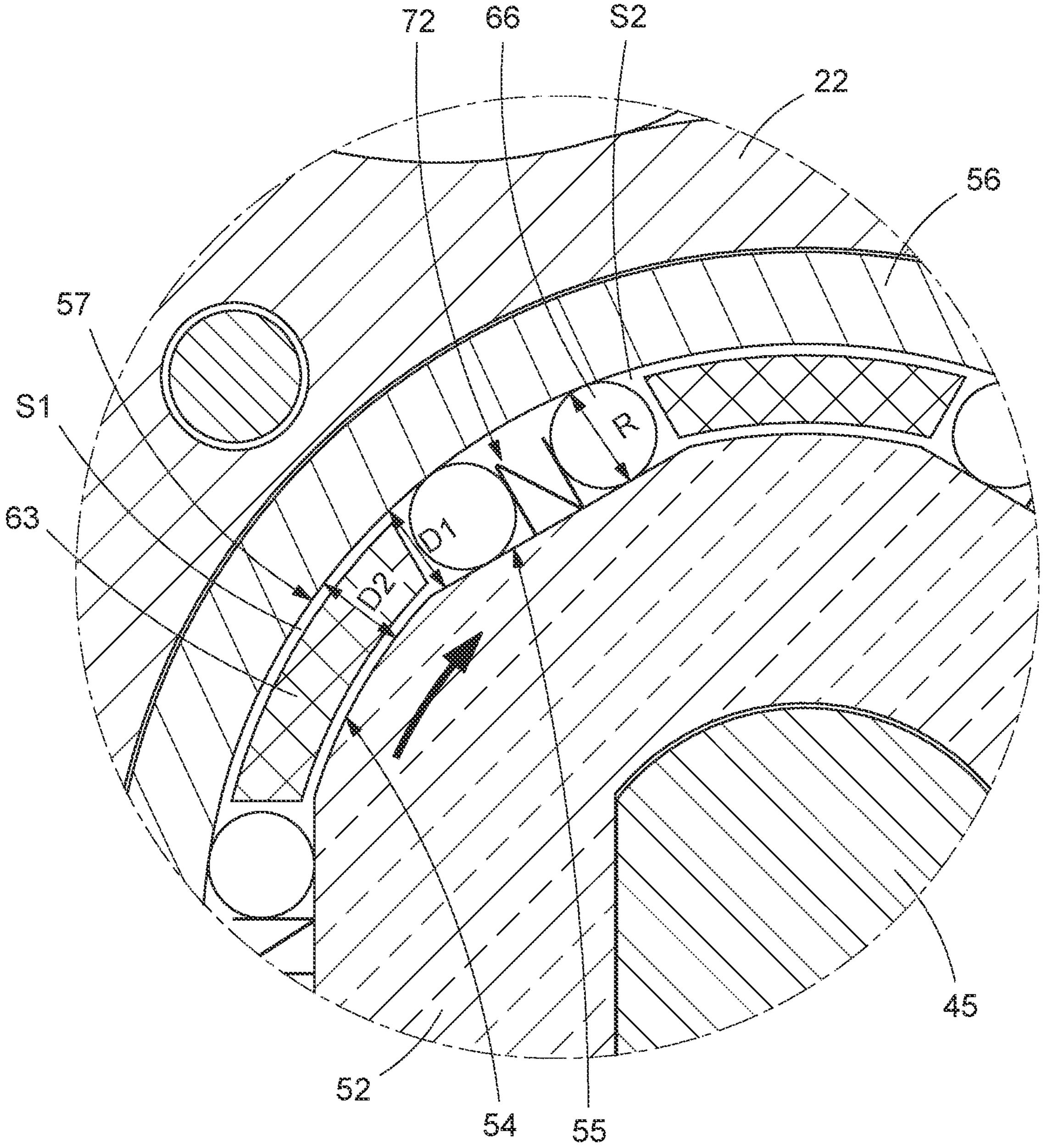
FIG. 21 is similar to FIG. 16, showing that the tangent plane of the rotating disk is abutted against the rolling elements.

Furthermore, as shown in FIG. 1, if the weight of the bicycle clamped on the clamp 14 is too heavy, the bicycle exerts a downward pressure on the gear rack 16, and the downward force is transmitted to the rotating disk 52 through the first teeth portion 161 of the gear rack 16 and the second teeth portion 47 of the gear 44, so that the rotating disk 52 is rotated slightly in a clockwise direction. As shown in FIG. 21, the interface between the outer peripheral surface 54 and the tangent plane 55 of the rotating disk 52 is abutted against one rolling element 66 located in the insertion space S2, so that the rolling elements 66 are pressed against the inner wall surface 57 of the fixed ring 56. This causes that the rotating disk 52 is unable to rotate relative to the fixed ring 56, so the gear rack 16 cannot be moved downwards relative to the sleeve tube 12. In this way, the danger of rapid falling of the gear rack 16 can be avoided.

As indicated above, the bicycle repair stand 1 of the present invention uses the lifting device 20 to drive the gear rack 16 to move upwards or downwards relative to the sleeve tube 12, thereby adjusting the height of the supporting rod 10, and further, the lifting device 20 provides a locking mechanism to prevent the gear rack 16 from rapid falling, thus allowing the user to be safer when using the bicycle repair stand 1 of the 5 present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A bicycle repair stand comprising:

a supporting rod having a sleeve tube and a gear rack movably inserted into the sleeve tube and provided with a first teeth portion; and a lifting device including:

a shell having a first chamber penetrated by the sleeve tube and the gear rack, and a second chamber communicating with the first chamber;

a gear rotatably disposed in the second chamber of the shell and having a second teeth portion meshed with the first teeth portion of the gear rack;

a rotating disk coaxially connected with the gear and having an arc-shaped outer peripheral surface provided with a tangent plane;

a fixed ring mounted in the second chamber of the shell and surrounding the outer peripheral surface of the rotating disk and having an inner wall surface forming an annular space with the outer peripheral surface of the rotating disk;

a driving base rotatably installed in the shell and having a disk portion received in the second chamber and provided with two pushing protrusions inserted into the annular space and forming an insertion space with the inner wall surface of the fixed ring and the tangent plane of the rotating disk, and a shaft portion extending from the disk portion and exposed to the shell;

two rolling elements accommodated in the insertion space; and a pushing member disposed between the rolling elements and applying a push force to the rolling elements;

wherein when an external force is applied to rotate the shaft portion of the driving base, one of the rolling elements is pushed by one of the pushing protrusions to move towards the other of the rolling elements, so that the rotating disk and the gear are driven to rotate relative to the fixed ring, thereby driving the gear rack to move upwards or downwards relative to the sleeve tube; when a downward pressure is applied to the gear rack, the downward pressure is transmitted to the rotating disk through the first teeth portion and the second teeth portion, and at this time, since the tangent plane of the rotating disk is abutted against the rolling elements, the rolling elements are abutted against the inner wall surface of the fixed ring, so that the rotating disk is unable to rotate relative to the fixed ring, thereby preventing the gear rack from moving downwards relative to the sleeve tube.

2. The bicycle repair stand as claimed in claim 1, wherein each of the rolling elements is a roller; a first spacing is defined between the inner wall surface of the fixed ring and the tangent plane of the rotating disk, and a second spacing is defined between the inner wall surface of the fixed ring and the outer peripheral surface of the rotating disk; a diameter of each rolling element is approximately equal to the first spacing and larger than the second spacing.

3. The bicycle repair stand as claimed in claim 1, wherein the rotating disk has a limiting hole, and the gear has a limiting shaft fitted into the limiting hole of the rotating disk, so that the rotating disk is coaxially connected to the gear.

4. The bicycle repair stand as claimed in claim 3, wherein the disk portion of the driving base has a bearing plate and six said pushing protrusions extending from the bearing plate and arranged at equal intervals with respect to the shaft portion; the rotating disk has six said tangent planes arranged at equal intervals with respect to the limiting hole; when the pushing protrusions are rotatably inserted into the annular space, the bearing plate is abutted against the rotating disk, and one said insertion space is formed between one of the pushing protrusions, the inner wall surface of the fixed ring, and one of the tangent planes; each of the insertion spaces contains two said rolling elements and one said pushing member.

5. The bicycle repair stand as claimed in claim 3, wherein the lifting device further includes a blocking plate abutted against the fixed ring and the rotating disk and having a sleeve hole fitted to the limiting shaft of the gear to cover the annular space and the insertion space.

6. The bicycle repair stand as claimed in claim 1, wherein the shell has an annular groove provided with a convexity; the fixed ring has an outer wall surface provided with a concavity engaged with the convexity of the shell, so that the fixed ring is fixed in the annular groove.

7. The bicycle repair stand as claimed in claim 1, wherein the pushing member is a spring having two ends thereof abutted against the rolling elements; when one of the rolling elements is moved towards the other of the rolling elements, the spring is compressed by the rolling elements.

8. The bicycle repair stand as claimed in claim 1, wherein the pushing member is formed by two rollers arranged in a stacked manner; when one of the rolling elements is moved towards the other of the rolling elements, the rollers are abutted against the rolling elements.

* * * * *